US012744791B2

(12) United States Patent
Tedesco

(10) Patent No.: US 12,744,791 B2
(45) Date of Patent: Sep. 22, 2026

(54) FLOW-BASED PACKET BATCHING FOR OPTIMIZED DEEP PACKET INSPECTION

(71) Applicant: Rapid7, Inc., Boston, MA (US)

(72) Inventor: Gianpaolo Tedesco, Seoul (KR)

(73) Assignee: Rapid7, Inc., Boston, MA (US)

( * ) Notice: Subject to any disclaimer, the term of this patent is extended or adjusted under 35 U.S.C. 154(b) by 68 days.

(21) Appl. No.: 18/738,137

(22) Filed: Jun. 10, 2024

(65) Prior Publication Data

US 2024/0333614 A1 Oct. 3, 2024

Related U.S. Application Data

(63) Continuation of application No. 17/979,081, filed on Nov. 2, 2022, now Pat. No. 12,047,259.

(51) Int. Cl.

*H04L 9/40* (2022.01)
*G06F 9/445* (2018.01)
(Continued)

(52) U.S. Cl.

CPC .............. *H04L 63/14* (2013.01); *G06F 9/445* (2013.01); *G06F 9/455* (2013.01); *H04L 43/028* (2013.01);
(Continued)

(58) Field of Classification Search

CPC ... H04L 63/14; H04L 43/028; H04L 43/0894; H04L 47/2441; H04L 47/35; H04L 47/36; H04L 63/06; H04L 67/12; H04L 69/16; H04L 41/0895; H04L 41/40; H04L 41/046; H04L 41/0806; H04L 41/12; H04L 67/02; H04L 69/325; H04L 69/326; G06F 9/445; G06F 9/455
(Continued)

(56) References Cited

U.S. PATENT DOCUMENTS 7,898,955 B1 3/2011 Wang et al.
2009/0135834 A1 5/2009 Guntur
(Continued)

*Primary Examiner* — Nicholas R Taylor
*Assistant Examiner* — Chong G Kim
(74) *Attorney, Agent, or Firm* — Ashwin Anand

(57) ABSTRACT

Disclosed herein are methods, systems, and processes for performing optimized batched packet processing in deep packet inspection (DPI) computing systems. A batch of network packets is received. A stateless processing operation is performed for the batch that includes updating a current time for the batch, decoding the network packets in the batch, creating a flowhash lookup key for each decoded network packet, and generating a first output that includes the current time and corresponding flow-hash lookup keys for the decoded network packets. Next, a stateful processing operation is performed for the batch that includes accessing the first output of the stateless processing operation, dividing the batch into multiple sub-batches, performing a parallel flow-hash table lookup operation on the network packets that are part of the sub-batches, and generating a second output that includes the sub-batches with associated packet flows. Finally, a batch-optimized DPI processing operation is performed that includes accessing the second output of the stateful processing operation and performing the DPI processing operation on a per-packet basis or on a per-flow basis.

19 Claims, 13 Drawing Sheets

(51) Int. Cl.

| | |
|---|---|
| ***G06F 9/455*** | (2018.01) |
| ***H04L 41/046*** | (2022.01) |
| ***H04L 41/0806*** | (2022.01) |
| ***H04L 41/0895*** | (2022.01) |
| ***H04L 41/12*** | (2022.01) |
| ***H04L 41/40*** | (2022.01) |
| ***H04L 43/028*** | (2022.01) |
| ***H04L 43/0894*** | (2022.01) |
| ***H04L 47/2441*** | (2022.01) |
| ***H04L 47/35*** | (2022.01) |
| ***H04L 47/36*** | (2022.01) |
| ***H04L 67/02*** | (2022.01) |
| ***H04L 67/12*** | (2022.01) |
| ***H04L 69/16*** | (2022.01) |
| ***H04L 69/325*** | (2022.01) |
| ***H04L 69/326*** | (2022.01) |

(52) U.S. Cl.

CPC ...... *H04L 43/0894* (2013.01); *H04L 47/2441* (2013.01); *H04L 47/35* (2013.01); *H04L 47/36* (2013.01); *H04L 63/06* (2013.01); *H04L 67/12* (2013.01); *H04L 69/16* (2013.01); *H04L 41/046* (2013.01); *H04L 41/0806* (2013.01); *H04L 41/0895* (2022.05); *H04L 41/12* (2013.01); *H04L 41/40* (2022.05); *H04L 67/02* (2013.01); *H04L 69/325* (2013.01); *H04L 69/326* (2013.01)

(58) Field of Classification Search

USPC .......................................................... 370/241

See application file for complete search history.

(56) References Cited

U.S. PATENT DOCUMENTS

| | | | | |
|---|---|---|---|---|
| 2010/0212006 | A1* | 8/2010 | Dolganow | ............ H04L 67/104 726/14 |
| 2013/0297798 | A1* | 11/2013 | Arisoylu | ............ H04L 67/1014 709/226 |
| 2014/0181267 | A1* | 6/2014 | Wadkins | ............... H04L 47/193 709/219 |
| 2014/0372616 | A1 | 12/2014 | Arisoylu et al. | |
| 2015/0312155 | A1 | 10/2015 | Anand et al. | |
| 2016/0149788 | A1 | 5/2016 | Zhang et al. | |
| 2020/0287996 | A1 | 9/2020 | Vann et al. | |

* cited by examiner

Deep Packet Inspection (DPI) Server
105

DPI Engine
110

Primary (Stateful) Packet Manager
115

Un-Grouped Variant Manager
120

Grouped Variant Manager
125

Secondary (Stateless) Packet Manager
130

Loop Un-Roller
135

Packet Management Engine
140

Timer
145

Hash Table (Flow Hash)
150

Flow Statistics
155(1)-(N)

Packet/Byte Counters
160(1)-(N)

Decoder(s)
165(1)-(N)

300

Process Boundary
340

Threads
335(1)-(N)

Receive Queues
320(1)-(N)

Switched
Port
Analyzer
305

Receive
Side
Scaling
(RSS)
Hash
315

RXQ #0

RXQ #1

RXQ #n

Thread #0

Thread #1

Thread #n

Post
Processing
(DPI Processing)
355

Network Interface Card (NIC)
310

Kernel
Bypass
325

Isolated
CPU Cores
330(1)-(N)

Shared
Memory
Ring Buffer
345

Linux
Process
350

*Kernel-Bypass and Shared-Nothing Architecture*

700

| *Overhead* | *Command* | *Object* | *Symbol* |
| --- | --- | --- | --- |
| 80.59% | http-orig | http-orig | parse_request |
| 9.63% | http-orig | Libc-2.26.so | _ctype_b_loc |
| 8.61% | http-orig | http-orig | _ctype_b_loc@plt |

*Profile of a HTTP decoder*

```
static hot const uint8_t *find_colon(const uint8_t *p,
                        const uint8_t *e)
{
      const __m128i syms = _mm_setr_epi8(
                              0, ' ',
                              '"', '"',
                              '(', ')',
                              ',', ',',
                              '/', '/',
                              ':', '@',
                              '[', ']',
                              '{', 0xff
                        );
      __m128i hs;
      int r;

      while(p + 16 <= e) {
            hs = _mm_loadu_si128((void*)p);
            r = _mm_cmpestri(syms, nr_syms, hs, 16,
                              _SIDD_LEAST_SIGNIFICANT
                              | _SIDD_CMP_RANGES
                              | _SIDD_UBYTE_OPS);
            if (unlikely(r != 16)) {
                  p += r;
                  if ( likely(p[0] == ':') )
                        return p;
                  return NULL;
            }

            p += 16;
      }

      /* And so on for remaining 8, 4, 2, 1 bytes... */
```

```
while(p + 16 <= e) {
    hs = _mm_loadu_si128((void*)p);
    r = _mm_cmpestri(syms, nr_syms, hs, 16,
                _SIDD_LEAST_SIGNIFICANT
                | _SIDD_CMP_EQUAL_RANGES
                | _SIDD_UBYTE_OPS);
    /* NOTE: using a single line of code to advance the start of the search space */
    p += r;
    if (unlikely(r != 16)) {
        if ( likely(p[0] == ':') )
            return p;
        return NULL;
    }
}
```

```
$ ./calc-words.py Proxy-Authorization
// len = 19
#define H64_PROXY_AUTHORIZATION_0 0x75412d79786f7250UL // "Proxy-Au"
#define H64_PROXY_AUTHORIZATION_1 0x74617a69726f6874UL // "thorizat"
#define H16_PROXY_AUTHORIZATION_2 0x6f69 // "io"
#define H8_PROXY_AUTHORIZATION_3 'n'
```

```
GET / HTTP/1.1
Host: www.scaramanga.co.uk
Connection: keep-alive
Upgrade-Insecure-Requests: 1
User-Agent: Mozilla/5.0 (X11; Linux x86_64) AppleWebKit/537.36 (KHTML, like Gecko) Ubuntu Chromium/64.0.3282.167 Chrome/64.0.3282.167 Safari/537.36
Accept: text/html,application/xhtml+xml,application/xml;q=0.9,image/webp,image/apng,*/*;q=0.8
DNT: 1
Accept-Encoding: gzip, deflate
Accept-Language: en-GB,en;q=0.9,en-US;q=0.8,de;q=0.7,ru;q=0.6,ko;q=0.5
```

| Variant | Cycles per req. | Reqs./second | Throughput: gbps |
|---|---|---|---|
| original | 5,609 | 500,658 | ~2.13 |
| sse4.2 | 405 | 6,933,783 | ~29.62 |

HTTP decoder benchmark results, small requests

| Variant | Cycles per req. | Reqs./second | Throughput: gbps |
|---|---|---|---|
| original | 39,078 | 71,862 | ~2.50 |
| sse4.2 | 1,635 | 1,717,573 | ~59.88 |

HTTP decoder benchmark results, large requests

Throughput for different User Datagram Protocol (UDP) packet sizes

1300

*Throughput for different Transmission Control Protocol (TCP) packet sizes*

1400
| Bucket | Cumulative Prob. |
|---|---|
| 1 second | 67.34% |
| 10 seconds | 73.99% |
| 1 minute | 80.21% |
| 5 minutes | 92.64% |
| 1 hour | 97.14% |
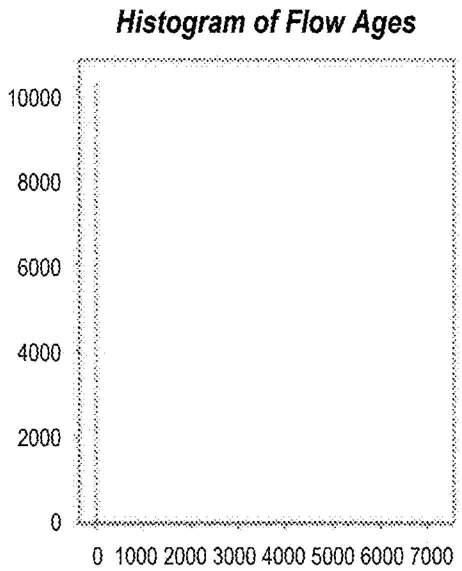
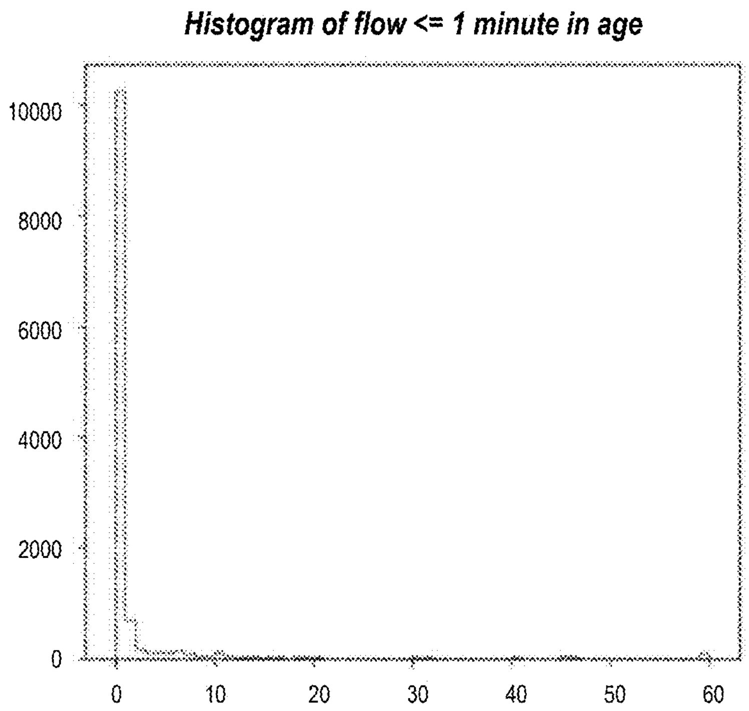
FIG. 14

FLOW-BASED PACKET BATCHING FOR OPTIMIZED DEEP PACKET INSPECTION

This Application claims priority under 35 U.S.C. § 120 and is a continuation of U.S. patent application Ser. No. 17/979,081, filed Nov. 2, 2022, titled "Pre-Flow Grouping of Packets for Optimized Deep Packet Inspection," the entire contents of which are incorporated herein by reference in its entirety.

CROSS-REFERENCE TO RELATED APPLICATIONS

The present application claims benefit of priority to U.S. Provisional Patent Application No. 62/910,745 filed on Oct. 4, 2019 titled "High Speed Deep Packet Inspection" the disclosure of which is hereby incorporated by reference as if set forth in its entirety herein.

BACKGROUND

Field of the Disclosure

This disclosure is related to systems and methods for examining and managing network traffic. In particular, this disclosure is related to batched packet processing for deep packet inspection (DPI) performed using a high performance DPI processor.

Description of the Related Art

Deep packet inspection (DPI) is an advanced method of examining and managing network traffic. DPI is a form of packet filtering that locates, identifies, classifies, reroutes, or blocks packets (e.g., network packets that are formatted units of data carried by a packet-switched network) with specific data or code payloads that conventional packet filtering, which examines only packet headers, cannot detect. DPI typically functions at the application layer of the Open Systems Interconnection (OSI) reference model.

In existing implementations of DPI systems, certain resource intensive processing and analysis steps are performed by the DPI system on each received packet (e.g., packet capture, decoding, flow analysis, state updating, event management, and the like). While per-packet processing can be performed efficiently for stateless processes, DPI, by it's very nature, is (mostly) a stateful process. Therefore, existing paradigms for optimizing the management of network traffic, even if such solutions include some form of batching, are unfortunately resource prohibitive in terms of cache and processing power utilization in the DPI scenario.

SUMMARY OF THE DISCLOSURE

Disclosed herein are methods, systems, and processes for performing optimized batched packet processing in a high performance deep packet inspection (DPI) processor (e.g., a DPI engine as described and disclosed herein).

In certain embodiments, one such method involves receiving a batch of network packets. Once received (e.g., by a packet capture mechanism), the method performs a stateless (secondary/bottom-half) processing operation for the batch, that includes updating a current time for the batch, decoding the network packets in the batch, creating a flow-hash lookup key for each decoded network packet, and generating a first output that includes the current time and corresponding flow-hash lookup keys for the decoded network packets.

In certain other embodiments, the method then performs a stateful (primary/top-half) processing operation for the batch, that includes accessing the first output of the stateless processing operation, dividing the batch into multiple sub-batches, performing a parallel flow-hash table lookup operation on the network packets that are part of the sub-batches, and generating a second output that includes the sub-batches with associated packet flows. Finally, the method performs a deep packet inspection (DPI) processing operation that includes accessing the second output of the stateful processing operation, and performing the DPI processing operation on a per-packet basis or on a per-flow basis.

In one embodiment, performing the DPI processing operation on the per-packet (un-grouped variant) basis, includes updating packet flow statistics for each network packet that is part of the sub-batches, performing transport layer state tracking for each network packet, and performing application layer processing for each network packet.

In another embodiment, performing the DPI processing on the per-flow (grouped variant) basis, includes grouping two or more network packets within each sub-batch together if the two or more network packets have a same packet flow, maintaining an order of the two or more network packets relative to each other within the same packet flow, updating packet flow statistics for each packet flow, performing transport layer state tracking for each packet flow followed by each network packet, and performing application layer processing for each packet flow followed by each network packet.

In some embodiments, decoding the network packets in the batch includes determining one or more internet protocol (IP) addresses, one or more ports, and an IP protocol associated with each of the network packets, a size of the batch in the first output is less than or equal to another size of the batch prior to performance of the stateless processing operation, the method involves comparing the current time with a next time and executing a timer bookkeeping operation, performing the transport layer state tracking includes applying one or more packet payload transformations for transfer control protocol (TCP), and the batch of network packets are received at a DPI engine that is implemented by a DPI server and executes one or more packet capture mechanisms.

The foregoing is a summary and thus contains simplifications and generalizations; consequently those skilled in the art will appreciate that the summary is illustrative only and is not intended to be limiting. Other aspects and features of the disclosure, as defined solely by the claims, will become apparent in the non-limiting detailed description set forth below.

BRIEF DESCRIPTION OF THE DRAWINGS

This disclosure may be better understood, and its objects, features, and advantages made apparent to those skilled in the art by referencing these drawings and/or figures.

FIG. 7 is a table 700 and illustrates a profile of a HTTP decoder, according to one embodiment of the present disclosure.

FIG. 8 is a code snippet 800 that illustrates a basic loop for a SSE instruction mm_cmpestri scan function, according to one embodiment of the present disclosure.

FIG. 9 is a code snippet 900 that illustrates an implementation of a check to avoid dependency hazards, according to one embodiment of the present disclosure.

FIG. 10 is a code snippet 1000 for performing fast case-insensitive string comparison, according to one embodiment of the present disclosure.

FIG. 11 is an illustration 1100 of a code snippet for evaluation and tables of performance results, according to one embodiment of the present disclosure.

FIG. 14 is an illustration 1400 of a table and graphs of AGE results, according to one embodiment of the present disclosure.

Figure 1:
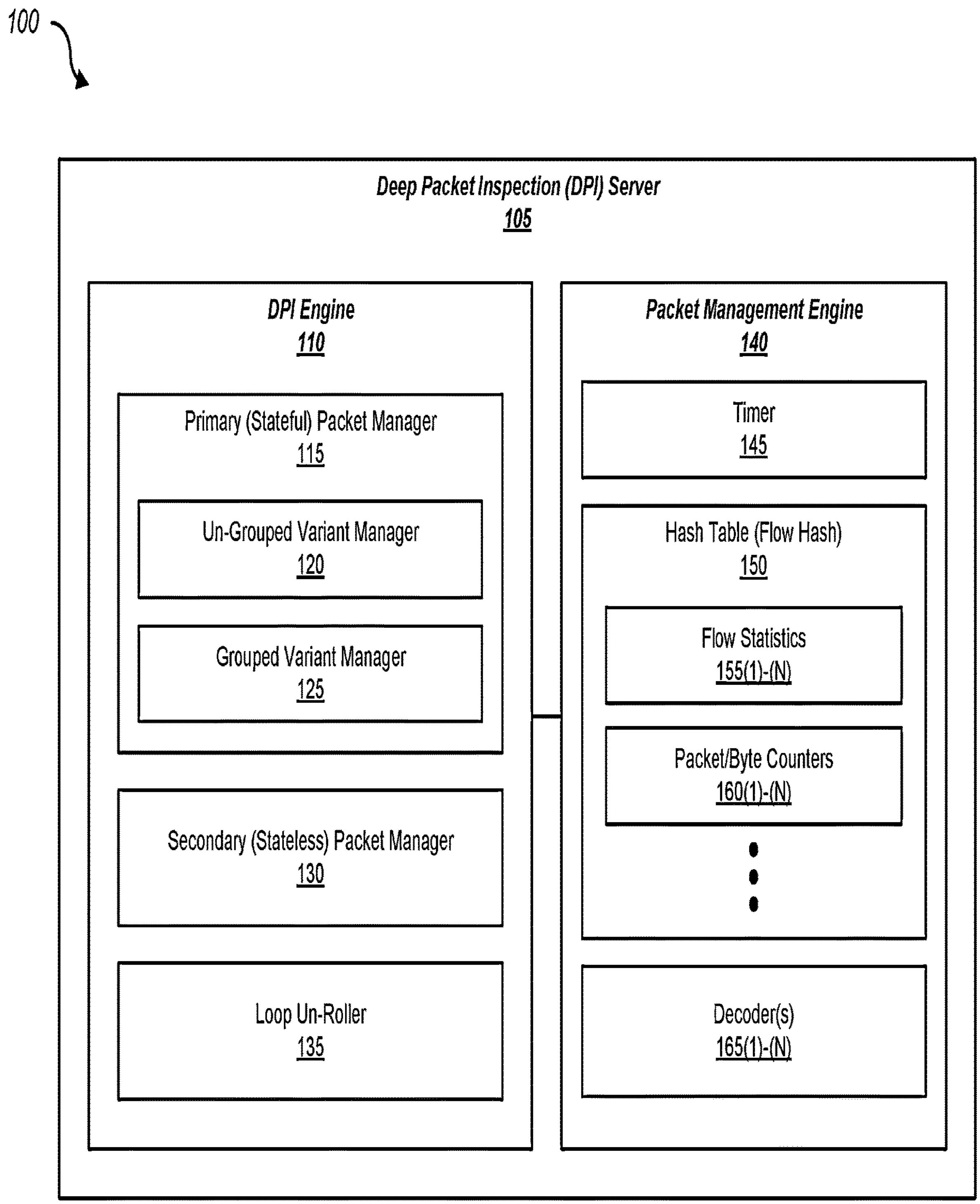
FIG. 1 is a block diagram 100 of a deep packet inspection (DPI) server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A network packet (e.g., hereinafter 'network packet' or simply 'packet') is a formatted unit of data carried by a packet-switched network. A packet includes control information (data for delivering a payload) and user data (the payload itself). Therefore, a packet is a unit of data that is routed between an origin (source) and a destination (target) on the Internet or any other packet-switched network. Network packets are typically between 1.5 KBS for Ethernet packets and 64 KBS for Internet Protocol (IP) packet payloads, and are passed over Transmission Control Protocol/IP (TCP/IP) networks.

As noted, deep packet inspection (DPI) is an advanced method of examining and managing network traffic. DPI is a form of packet filtering that locates, identifies, classifies, reroutes, or blocks packets (e.g., network packets that are formatted units of data carried by a packet-switched network) with specific data or code payloads that conventional packet filtering, which examines only packet headers, cannot detect. DPI typically functions at the application layer of the Open Systems Interconnection (OSI) reference model.

A DPI computing system or a DPI engine normally processes and performs certain steps (e.g., computing operations) on every received packet. First, a packet is captured. Second, the packet is decoded at the network layer. Third, the packet is associated with a flow (e.g., a sequence of packets belonging to the same flow, i.e., same IP addresses, ports, and IP protocol). For example, if a flow is defined by the 5-tuple (ipproto, src, sport, dst, dport) (e.g., TCP 1.1.1.1, 123, 2.2.2.2, 456), then packets in both directions would be part of the flow (e.g., both TCP 1.1.1.1 123→2.2.2.2 456 and the reverse 2.2.2.2 456→1.1.1.1 123). Fourth, bookkeeping on the flow state is performed (e.g., updating flow statistics in a flow hash table). For example, interleaved with the bookkeeping step can be costly bookkeeping operations such as timer expirations or the production of events. Fifth and finally, only after the foregoing steps are successfully performed, can the DPI engine can begin deep packet inspection of the packets. Typically, existing DPI engines include a packet processing main loop/mainloop (e.g., a top level control flow construct in an input- or event-drive computer program) in which a single packet is considered at each time step. At each time step, the at least the above five processing steps take place.

It will be appreciated that many operations do not need to take place per packet, but instead, can be performed must less frequently. It will also be appreciated that, for modern compilers, especially in the case of link-time optimization (LTO) (which refers to program optimization during linking where a link pulls object files together and combines them into a single program; the linker can then see the whole of the program and can therefore do whole-program analysis and optimization), the inlining (e.g., a compiler optimization that replaces a function call site with the body of the called function) and loop un-rolling (e.g., a loop transformation technique that attempts to optimize a program's execution speed at the expense of the program's binary size in an approach called space-time tradeoff) optimization passes can be critical to obtaining performant object code on hot loops such as those in the aforementioned packet processing mainloop. An additional consideration is the growing mismatch between internal central processing unit (CPU) speeds and memory latency, which makes the effective use of CPU cache resources a critical consideration. Therefore, if the compiler can generate shorter inner-loops (e.g., nested or contained loops) and spend more time there before moving on to the next step, then there is more cache space in which loops can unroll, thereby increasing useful instruction throughput and decreased overhead instruction throughout.

As previously noted, in existing implementations of DPI systems, certain resource intensive processing and analysis steps are performed by the DPI system or the DPI engine (as disclosed and described herein) on each received packet (e.g., packet capture, decoding, flow analysis, state updating, event management, and the like). While per-packet processing can be performed somewhat efficiently for stateless processes (e.g., where a server is not needed to keep server information or session details associated with packets and their respective flows to itself), DPI, by its very nature, is (more of) a stateful process (e.g., where a DPI server is required to maintain the current state and session information about packets, packet flows, and other associated metadata, and multiple processing and operational steps are required for each packet). Therefore, existing methodologies, paradigms, and computing systems for optimizing the management of network traffic, even if such solutions and systems include some form of likely rudimentary batching, are unfortunately resource prohibitive in terms of cache and processing power utilization in the DPI scenario (e.g., because of dependency hazards and various other performance limiting issues as disclosed herein).

Disclosed herein are methods, systems, and processes for performing optimized batched packet processing in a high performance DPI processor (e.g., a DPI engine as described and disclosed herein). First, the DPI engine implements a batch-mode or burst-mode operating model such that packets are processed in batches. As a result, costly bookkeeping operations which typically occur at time intervals rather than for every packet can be hoisted outside of the packet processing inner loop (which a compiler has more latitude to effectively optimize). Second, and significantly, the DPI engine groups "like" or "similar" operations together in batches of packets, rather than treating each packet in turn, thus simplifying the loop structures in the object code, thereby permitting effective use of CPU instruction and data caches as well as providing the ability to take advantage of compiler optimization passes.

Technology-Related Problems with Existing Batching Methodologies

An (existing) DPI engine that performs per-packet processing typically performs the following operations: (1) obtains a packet, (2) updates the current time, (3) compares the current time to the next timer deadline (and if the deadline has passed, performs timer bookkeeping), (4) decodes the packet, (5) looks-up/inserts the (packet) flow for the packet in a flow table (or flow hash table), (6) updates the flow statistics, (7) decides which application protocol inspection to apply, and (8) performs the deep packet processing.

Although using batching to reduce per-item overhead exists, this solution has been limited to packet processing applications (e.g., in the Data Plane Development Kit (DPDK) scenario) for L2/L3 switching and/or routing applications. On the contrary, disclosed herein are methods, systems, and processes for a precise structure and ordering of operations that applies batching in the DPI scenario. For example, loops on each side can be more tightly optimized together by switching less frequently between device driver code and network stack code because two smaller loops are easier for a compiler to optimize together than one large loop—they are much more likely to end up in the same function, the same file, or at least get inlined together where the compiler can apply the optimization pass to them as a whole (the more spread out, and larger the code is, the less likely this will occur). Unfortunately, performing such batching in the DPI scenario, given its stateful nature with multiple operational and processing steps, introduces additional complexities and problems in performing the foregoing optimization.

DPI requires focus on reducing the overhead parts of each of the many different steps which need to be performed. In addition, there are significant concerns about data dependencies which may arise due to the inherently stateful nature of the (DPI) processing. Disclosed herein are methods, systems, and processes for performing optimized batched packet processing in a high performance DPI engine that address the foregoing technology-related problems.

Example Deep Packet Inspection (DPI) Engine

FIG. 1 is a block diagram 100 of a deep packet inspection (DPI) server 105, according to one embodiment. DPI server 105, which can be any type of computing device, includes and implements at least a DPI engine 110. DPI engine 110 includes a primary (stateful or top-half) packet manager 115, a secondary (stateless or bottom-half) packet manager 130, and a loop un-roller 135 (e.g., for performing compiler-based optimizations). Primary packet manager 115 further includes an un-grouped variant manager 120 and a grouped variant manager 125.

DPI server 105 also includes a packet management engine 140 with a timer 145, a hash table (also called a flow hash or flow table), and one or more decoders 165(1)-(N). Hash table 150 maintains flow statistics 155(1)-(N) and packet/byte counters 160(1)-(N). Packet management engine 140 also includes one or more packet capture mechanisms (e.g., the pcap_dispatch( ) function in the libcap library, rte_eth_rx_burst( ) function in the Data Plate Development Kit (DPDK), and the like). As noted, a flow is a sequence of packets belonging to the same flow. A flow item is a record in the flow table (e.g., in hash table 150). The flow table is a map/hash with keys that include source and destination IP addresses of the (packets in the) flow, the IP protocol (e.g., TCP or User Datagram Protocol (UDP)), and values that are flow statistics and packet/byte counters associated with the given flow. In this manner, packets decoded by a decoder can be identified based on their flow-hash lookup keys maintained in the flow table.

In one embodiment, DPI engine 110: (1) obtains a batch of packets (e.g., 64 packets), (2) updates the current time once per batch, (3) compares the current time to a timer deadline (and performs time bookkeeping once per batch), (4) decodes each packet within the batch, (5) divides the batch into smaller sub-batches (<=initial batch size), (6) performs a parallel flow hash table lookup on multiple packets at once, (7) groups packets together with their respective flows within each sub-batch, and (8) performs DPI processing (among other operations).

Example of Optimized Batch Processing Using a DPI Engine

In certain embodiments, DPI engine 105 receives a batch of network packets (e.g., from a packet capture mechanism, discussed above). In the first step, secondary (stateless or bottom-half) packet manager 130 performs a stateless processing operation for the batch that includes the following additional steps: (a) updating the current time for the batch, (b) decoding the network packets in the batch (e.g., determining one or more IP addresses, one or more ports, and an IP protocol associated with each of the packets), (c) creating flow-hash lookup keys for the decoded packets (based on step (b)), and (d) generating a first (stateless/bottom-half) output that includes the current time and corresponding flow-hash lookup keys for the decoded network packets (where a size of the batch in the first output is less than or equal to the original size of the batch prior to performance of the stateless/bottom-half processing operation).

In the second step, primary (stateful/top-half) packet manager 115 takes over and performs a stateful processing operation for the batch that includes the following additional steps: (1) accessing the first output of the stateless processing operation (from above), (2) dividing the batch into multiple sub-batches, (3) performing a parallel flow-hash table lookup on the packets that are part of the sub-batches, and (4) generating a second (stateful/top-half) output that includes the multiple sub-batches with associated flows. Finally, after the bifurcated packet processing approach discussed above, DPI engine 110 performs and/or proceeds with the final step of batched packet processing by accessing the second output of the stateful/top-half/primary processing operation (the second step) and performing at least a portion of deep pack inspection on a per-packet basis (un-grouped variant U) or on a per-flow basis (grouped variant G).

In some embodiments, performing at least one or more DPI-related operations on a per-packet (top-half processing variant U) basis includes updating packet flow statistics for each packet that is part of the sub-batches (e.g., updating flow statistics 155(1)-(N)), performing transport layer state tracking for each packet (e.g., by applying one or more packet payload transformations for TCP), and performing application layer processing for each packet. It should be noted that the DPI-related operations discussed above with respect to top-half variant U are merely illustrative. DPI engine 110 can also implement a port scanning functionality or an anomaly detector, which can be performed on a per-packet basis.

In other embodiments, performing at least one or more DPI-related operations on a per-flow (top-half processing variant G) basis includes grouping two or more packets within each sub-batch if these two or more packets have the same flow (e.g., packet flow), maintaining an order of the two or more packets relative to each other within the same flow, updating flow statistics for each flow, and then performing transport layer state tracking for each flow followed by each packet and performing application layer processing for each flow followed by each packet. As noted above, the DPI-related operations discussed above with respect to top-half variant G are merely illustrative. DPI engine 110 can also implement a port scanning functionality or an anomaly detector, which can be performed on a per-flow basis.

Example of Bifurcated Batched Packet Processing for DPI

Figure 2:
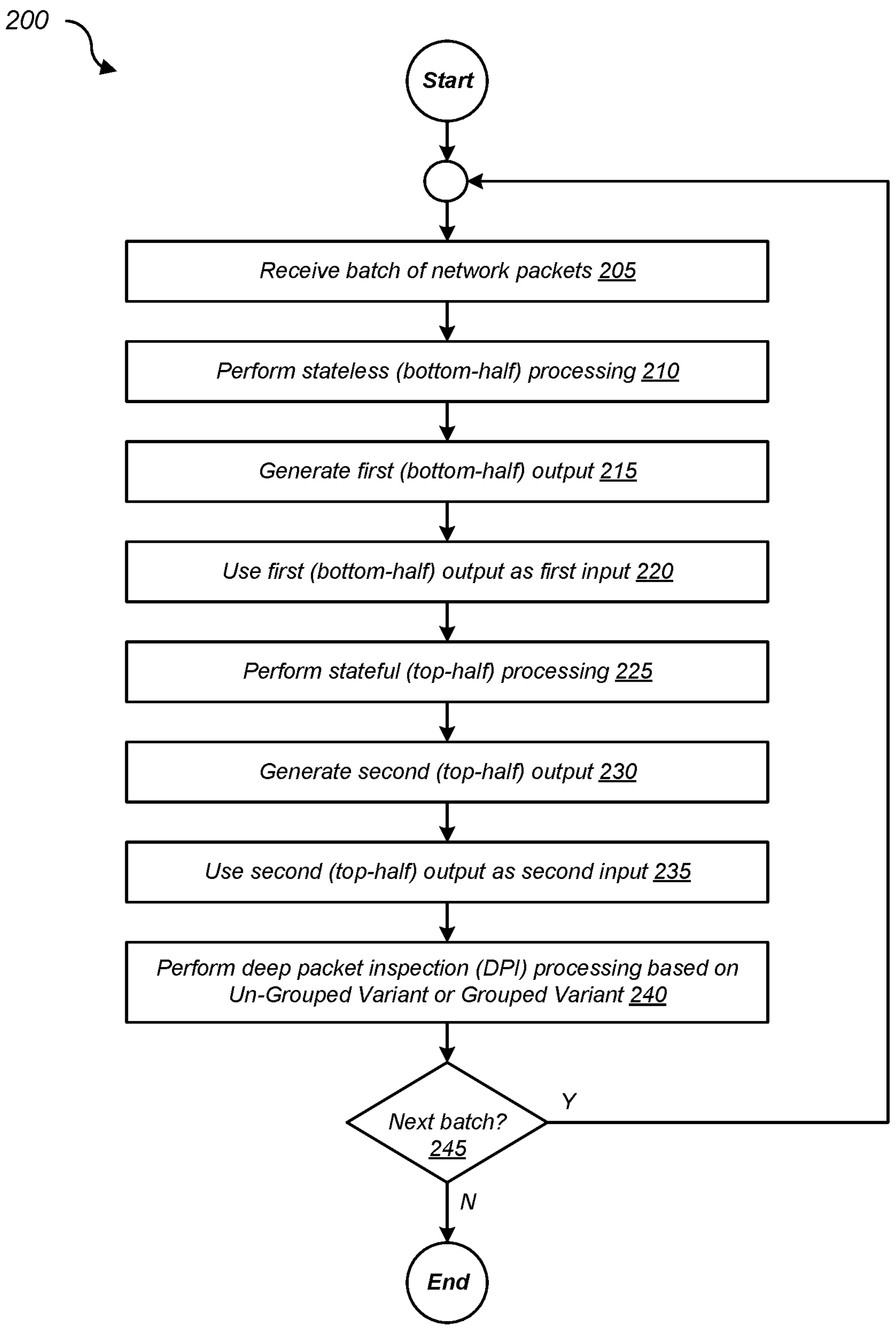
FIG. 2 is a flowchart 200 of a process for performing optimized batched packet processing in a high performance DPI processor, according to one embodiment of the present disclosure.

FIG. 2 is a flowchart 200 of a process for performing optimized batched packet processing in a high performance DPI processor, according to one embodiment. The process begins at 205 by receiving a batch of packets. Packets can arrive (and are received) based on one or several packet capture mechanisms that can be implemented by DPI server 105 (e.g., the pcap_dispatch( ) in libcap, rte_eth_rx_burst( ) in DPDK, and the like).

In one embodiment, processing of packets in batches is divided into two broad phases (discussed at the first step and second step above)—"bottom-half" and "top-half." These phases respectfully correspond to "stateless" and "stateful." The stateless bottom-half phase proceeds similarly with respect to switching/routing applications. However, the "top-half" processing can result in several problems and risks associated with data-dependency hazards (as discussed below) and thus requires additional care and consideration.

In some embodiments, batches are processed by DPI engine 110 in at least two different sizes. The bottom-half (secondary packet manager 130) processes large batches and the top-half (e.g., primary packet manager 115) processes small batches (e.g., because of the relative trade-offs in specific processing which is performed at each stage). For example, large batches can include at least 64 packets and small batches can include at least 8 packets. While both batches for the top-half and the bottom-half may be the same size, small batches, by their very definition, cannot be larger than large batches.

At 210, the process performs stateless/secondary/bottom-half processing. For bottom-half processing, secondary packet manager 130 obtains/receives a large batch of packets (e.g., a batch with 64 packets), updates the current time (e.g., using timer 145), and for each packet, decodes the network layer (e.g., IP addresses, ports, IP protocol→lookup key for flow-hash). Secondary packet manager 130 now generates an output that includes the current time, and the decodes/flow lookup keys for all packets which could be decoded. It should be noted that the output batch size for this first stage/phase is less than or equal to the size of the input batch. Therefore, output from the bottom-half is the input to the top-half.

At 215, the process generates a first output (e.g., stateless/bottom-half output that includes the current time, and the decodes/flow lookup keys for all packets which could be decoded, as noted above). In some embodiments, the first output is a data structure that contains several items such as the current time and the batch of packets. For each packet, decoder 165(1) decodes/strips off the ethernet TCP/IP headers and places the flow-hash key (e.g., containing src_ip, dst_ip, sport, dport, ipproto, and the like) into a structure (e.g., flow hash 150). It should be noted that the foregoing information/results/metadata generated as the result of the decoding is referred to as a "decode" (a noun) and is illustrated by the following example script:

```
struct burst {
  time_t current_time;
  struct {
    bytes the_packet;
    flow_key key;
    eth ether_hdr;
    ipv4 ip_hdr;
    ...
  }packets[BATCH_SIZE];
}
```

At 220, the process uses the first (bottom-half) output as the first input (as noted above) and at 225, performs stateful (top-half) processing using primary packet manager 115. For example, primary packet manager 115 obtains the current time and the packet/decode batch from the bottom-half step (as described above), checks the current time versus the next timer, and runs timer bookkeeping. Next, primary packet manager 115 divides the bottom-half batch (e.g., the large batch). The dividing is performed linearly (e.g., a batch of 64 packets is divided into smaller batches of 8 packets each—with a small last batch if the batch size is unevenly sized).

After dividing the bottom-half batch, primary packet manager 115 accesses the flow-hash lookup key for each packet and looks up the corresponding flow (e.g., in flow hash 150). In some embodiments, various hash table techniques are contemplated that permit multiple look ups to be performed in parallel in order to hide memory latencies. However, as described above, a dependency hazard may arise at this step/juncture. For example, if during a lookup, a record is not found, a new record has to be inserted. However, when attempting the insert, the hash table (e.g., hash table 150) may lack space and another (flow) item may have to be unfortunately deleted. To wit, if a flow item for packet #2 is deleted, which was caused by the lookup for packet #1, then both packets #1 and #2 will point to the same flow item, even though both packets #1 and #2 are part of different packet flows. Therefore, the aforementioned problem is related to looking up flow items in batches and storing pointers to flow records—a lookup/insert in hash table 150 can run out of space, causing an object in memory (e.g., of DPI server 105) to be 'deleted' from the hash (and re-used for a different flow). The foregoing scenario causes incorrect results.

To ameliorate the foregoing technical problem(s), the process, at 230, generates a second output (top-half/stateful). The second output includes the batch of packets with associated flows. At this juncture, primary packet manager 115 has two options to complete processing of the batch(s) of packet(s) (e.g., sub-batches of packets of the original 64 packet batch), and at 240, performs DPI processing based on an un-grouped variable or a grouped variable. In one embodiment, un-grouped variant manager 120 accesses the second output, and for each packet: updates flow statistics, performs transport layer state tracking (e.g., applies packet payload transformations for TCP such as retransmit/overlap trimming, and the like), and performs application layer processing. In this example, flow statistics 155(1)-(N) are maintained in hash table 150 (also called flow table or flow hash). Packet/byte counters 160(1)-(N) are part of the flow table. The value of the flow table can contain various other operational metadata in addition to the count of bytes/packets. Other operations in addition to counters are contemplated. In another embodiment, grouped variant manager 125 groups packets associated with the same flow while maintaining their order relative to each other within a given flow. Next, flow statistics are updated for each flow (e.g., if a flow has 5 packets, a single addition is made to the flow packet counter instead of 5 separate increments), transport layer state tracking is performed for each flow followed by each packet, and application layer processing is performed for each flow followed by each packet. If there are no more batches, the process ends at 245.

As previously noted, updating flow statistics, performing transport layer state tracking, and performing application layer processing is specific to DPI engine 110 in the DPI scenario. In certain embodiments, other security-related (but non-packet inspection-related) operations are also contemplated. For example, instead of performing transport layer state tracking or application layer processing, DPI engine 110 can implement a port scanning functionality or an anomaly detector, or perform application layer protocol decoding (which can be considered to be part of 'DPI' processing).

Example Computing System Optimizations of DPI Engine for DPI

It will be appreciated that DPI engine 110 improves the rate at which a packet capture process/thread (e.g., a Linux process using a packet socket to capture packets) can perform DPI-related tasks and operations. Furthermore, by reducing the frequency with which the system clock is examined and reducing the frequency at which timer management bookkeeping is performed, DPI engine 110 frees up more CPU time for packet processing, thereby increasing the rate at which packets are processed.

In addition, grouping together like operations on batches of packets (e.g., instead of performing decode/hash lookup like DHDHDHDHDHDH, DPI engine 110 performs DDDDDDHHHHH—a batch of decodes followed by a batch of hash lookups, and the like) improves the viability of loop-unrolling as a compiler optimization method and also makes better use of CPU instructions or data cache.

DPI engine 110 uses loop un-roller 135 to perform compiler optimization. For example, consider an example loop with a simple operation inside:

```
for(total = i = 0; i < 999999999; i++) {
    total += item[i].size;
}
```

An example loop the compiler generates is:

```
.L3:
    addq (%rsi), %rax # do the actual work total += item[i].size
    addq $8, %rsi # add sizeof(item) to get pointer to the next
item
    cmpq %rdx, %rsi # compare item >= end
    jne .L3 # jump back to beginning if not finished
    ret # return
```

Based on the foregoing, it will be appreciated that the first 4 instructions will be executed multiple times, but only one (a single) instruction is performing any 'work.' Therefore, in this example case, loop overhead is 75%. In loop unrolling, the compiler transforms code (like the above) into:

```
for(total = i = 0; i < 999999999; i += 4) {
    a = item[i + 0].size;
    b = item[i + 1].size;
    c = item[i + 2].size;
    d = item[i + 3].size;
    total += (a + b) + (c + d);
(edited)
```

The example code now generated (with loop overhead of 50% of instructions as opposed to 75% in the example above) is:

```
.L3:
movq        8(%rsi), %rax
addq        $32, %rsi
addq        -32(%rsi), %rax # one add
addq        -16(%rsi), %rax # two adds
addq        -8(%rsi), %rax # tnree adds
addq        %rax, %r8 # four adds
cmpq        %rsi, %rdx
jne         .L3
ret
```

Therefore in the DPI scenario, example existing paradigms can be shown by:

```
for (each packet as pkt) {
    timestamp = time_now( );
    decode = decode(pkt);
    if (timestamp > next_bookkeeping_time) {
        expire_old_flows(flow_hash);
        next_bookkeeping_time = now + interval;
    }
    flow_item = flow_hash_lookup_insert(decode.key);
    update_stats(flow_item, pkt);
    dpi(flow_item, pkt);
}
(edited)
```

Unfortunately, the problem with the foregoing is that each function (e.g., decode, bookkeeping, hash lookups, flow statistics update, deep packet inspection, and the like) involves a significant amount of code. For example, the very innermost loop (for each packet) calls at least half a dozen functions, which cannot be reasonably inlined. Therefore, the compiler may not be able to unroll the outermost loop because there is an excessive amount of code inside (the compiler will not copy and paste the entire program 4 or 8 times). Even if the compiler did so, the compiler may only unroll multiple jumps to other functions, instead of inlining those functions.

In the instant application and disclosure, DPI engine 110 permits the following:

```
for (every 64 packets as batch) {
  timestamp = time_now( );
  if (timestamp > next_bookkeeping_time) {
    expire_old_flows(flow_hash);
    next_bookkeeping_time = now + interval;
  } for (each pkt in batch) {
    decode[i] = decode(pkt[i]);
  } for (each pkt in batch) {
    flow_item[i] = flow_hash_lookup_inserti]);
  } for (each pkt in batch) {
    update_stats(flow_item[i], pkt[i]);
  }
}
```

It will be appreciated that in the foregoing representation and in certain embodiments, the compiler can be configured to perform more an advantageous combination of inlining and loop unrolling because each part is a function (e.g., decode_batch( ), flow_hash_lookup, insert_batch( ), and the like). Further, inside each function (e.g., with the scope of function-at-a-time or file-at-time for compiler optimization), the compiler now encounters a simple loop that can be unrolled and code can be inlined (or not inlined) in the context of that given loop. Therefore, rather than the compiler having to process multiple functions which operate on a single packet, the compiler can now process multiple functions operating on a short array of packets and is thus able to avail itself of loop unrolling as an optimization mechanism. In addition, in one or more of the foregoing cases, there exist certain operations (e.g., timestamps) that do not need to be performed once per packet and can be performed once per batch.

Finally, it will be appreciated that handling packets in batches permits for latency-hiding hash table optimizations (e.g., bulk/batch lookups) to be performed. In certain embodiments, multiple memory locations to be examined can be prefetched in parallel, taking advantage of memory-level parallelism in computer systems (e.g., DPI server 105). Since latencies are taken in parallel, the memory-latency for a batch of packets is equal to the longest latency among the batch, rather than the sum of all latencies. In the grouped variant discussed above, by ensuring successive packets are modifying the same flow state updates are minimized, and also more likely to be in cache. It will be appreciated that the foregoing embodiments, either alone or in combination, produce an average per-packet processing time which leads to greater bandwidth per core or overall core counts in DPI applications.

Therefore, the methods, systems, and processes disclosed herein perform optimized batched packet processing in a high performance DPI processor (e.g., DPI engine 110 as described and disclosed herein).

Example Kernel-Bypass and Shared-Nothing Architecture

Figure 3:
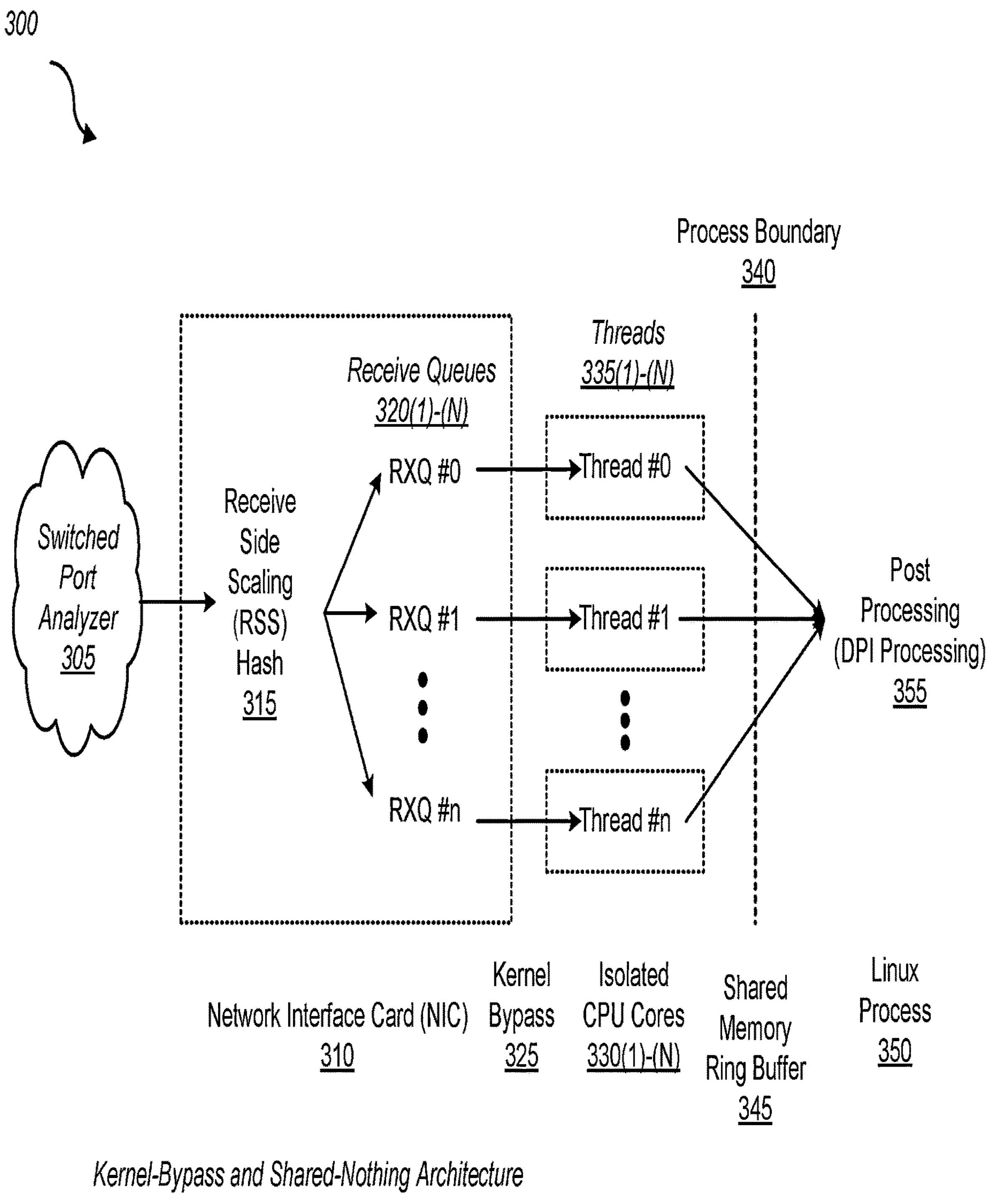
FIG. 3 is a block diagram 300 of an example Kernel-Bypass and Shared-Nothing Architecture for a DPI server, according to one embodiment of the present disclosure.

FIG. 3 is a block diagram 300 of an example Kernel-Bypass and Shared-Nothing Architecture for DPI server 105 implementing DPI engine 110, according to one embodiment. DPI server 105 includes a switched port analyzer (SPAN) 305 and a network interface card (NIC) 310. NIC 310 uses a Receive Side Scaling (RSS) hash 315 to process a batch of packets into receive queues 320(1)-(N) (shown as RXQs 0-*n* in FIG. 3). After bypassing the kernel (e.g., kernel bypass 325), the packets are processed in threads 335(1)-(N) on isolated CPU cores 330(1)-(N). Post processing (e.g., DPI processing) 355 occurs outside a shared memory ring buffer 345 which is a process boundary 340 (e.g., of Linux process 350).

Example Computing and Networking Environment

Figure 4:
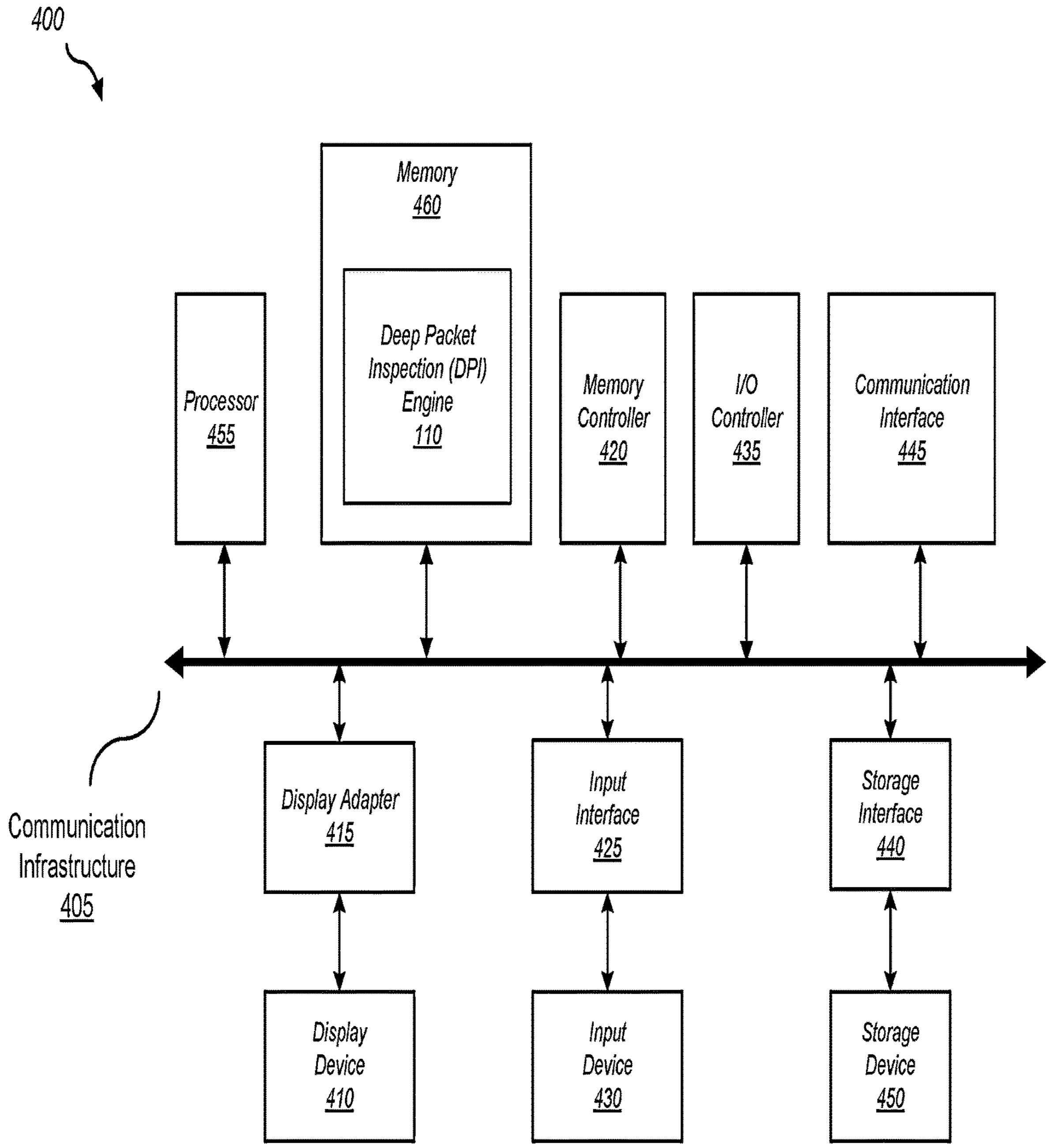
FIG. 4 is a block diagram 400 of a high speed DPI engine implemented in software, according to one embodiment of the present disclosure.

FIG. 4 is a block diagram 400 of a computing system, illustrating how a DPI engine 110 can be implemented in software, according to one embodiment. Computing system 400 can include a DPI server 105 and broadly represents any single or multi-processor computing device or system capable of executing computer-readable instructions. Examples of computing system 400 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 400 may include at least one processor 455 and a memory 460. By executing the software that executes DPI engine 110 (in addition to various other modules, managers, engines, and the like), computing system 400 becomes a special purpose computing device that is configured to optimize batch packet processing for DPI.

Processor 455 generally represents any type or form of processing unit capable of processing data or interpreting and executing instructions. In certain embodiments, processor 455 may receive instructions from a software application or module that may cause processor 455 to perform the functions of one or more of the embodiments described and/or illustrated herein. For example, processor 455 may perform and/or be a means for performing all or some of the operations described herein. Processor 455 may also perform and/or be a means for performing any other operations, methods, or processes described and/or illustrated herein. Memory 460 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 400 may include both a volatile memory unit and a non-volatile storage device. In one example, program instructions implementing DPI engine 110 may be loaded into memory 460.

In certain embodiments, computing system 400 may also include one or more components or elements in addition to processor 455 and/or memory 460. For example, as illustrated in FIG. 4, computing system 400 may include a memory controller 420, an Input/Output (I/O) controller 435, and a communication interface 445, each of which may be interconnected via a communication infrastructure 405. Communication infrastructure 405 generally represents any type or form of infrastructure capable of facilitating communication between one or more components of a computing device.

Memory controller 420 generally represents any type/form of device capable of handling memory or data or controlling communication between one or more components of computing system 400. In certain embodiments memory controller 420 may control communication between processor 455, memory 460, and I/O controller 435 via communication infrastructure 405. I/O controller 435 generally represents any type or form of module capable of coordinating and/or controlling the input and output functions of a computing device. For example, in certain embodiments I/O controller 435 may control or facilitate transfer of data between one or more elements of computing system 400, such as processor 455, memory 460, communication interface 445, display adapter 415, input interface 425, and storage interface 440.

Communication interface 445 broadly represents any type/form of communication device/adapter capable of facilitating communication between computing system 400 and other devices and may facilitate communication between computing system 400 and a private or public network. Examples of communication interface 445 include, a wired network interface (e.g., network interface card), a wireless network interface (e.g., a wireless network interface card), a modem, and any other suitable interface. Communication interface 445 may provide a direct connection to a remote server via a direct link to a network, such as the Internet, and may also indirectly provide such a connection through, for example, a local area network. Communication interface 445 may also represent a host adapter configured to facilitate communication between computing system 400 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 400 may also include at least one display device 410 coupled to communication infrastructure 405 via a display adapter 415 that generally represents any type or form of device capable of visually displaying information forwarded by display adapter 415. Display adapter 415 generally represents any type or form of device configured to forward graphics, text, and other data from communication infrastructure 405 (or from a frame buffer, as known in the art) for display on display device 410. Computing system 400 may also include at least one input device 430 coupled to communication infrastructure 405 via an input interface 425. Input device 430 generally represents any type or form of input device capable of providing input, either computer or human generated, to computing system 400. Examples of input device 430 include a keyboard, a pointing device, a speech recognition device, or any other input device.

Computing system 400 may also include storage device 450 coupled to communication infrastructure 405 via a storage interface 440. Storage device 450 generally represents any type or form of storage devices or mediums capable of storing data and/or other computer-readable instructions. For example, storage device 450 may include a magnetic disk drive (e.g., a so-called hard drive), a floppy disk drive, a magnetic tape drive, an optical disk drive, a flash drive, or the like. Storage interface 440 generally represents any type or form of interface or device for transmitting data between storage device 450, and other components of computing system 400. Storage device 450 may be configured to read from and/or write to a removable storage unit configured to store computer software, network packet data and statistics, or other computer-readable information. Examples of suitable removable storage units include a floppy disk, a magnetic tape, an optical disk, a flash memory device, or the like. Storage device 450 may be configured to read and write software, data, or other computer-readable information. Storage device 450 may also be a part of computing system 200 or may be separate devices accessed through other interface systems (e.g., over a network).

Many other devices or subsystems may be connected to computing system 400. Conversely, all of the components and devices illustrated in FIG. 4 need not be present to practice the embodiments described and/or illustrated herein. The devices and subsystems referenced above may also be interconnected in different ways from that shown in FIG. 4. Computing system 400 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 400 for storage in memory via a network such as the Internet or upon a carrier medium.

The computer-readable medium containing the computer program may be loaded into computing system 400. All or a portion of the computer program stored on the computer-readable medium may then be stored in memory 460, and/or various portions of storage device 450. When executed by processor 455, a computer program (e.g., DPI engine 110) loaded into computing system 400 may cause processor 455 to perform and/or be a means for performing the functions of one or more of the embodiments described/illustrated herein. Alternatively, one or more of the embodiments described and/or illustrated herein may be implemented in firmware and/or hardware, or via machine learning models (both supervised and unsupervised).

Figure 5:
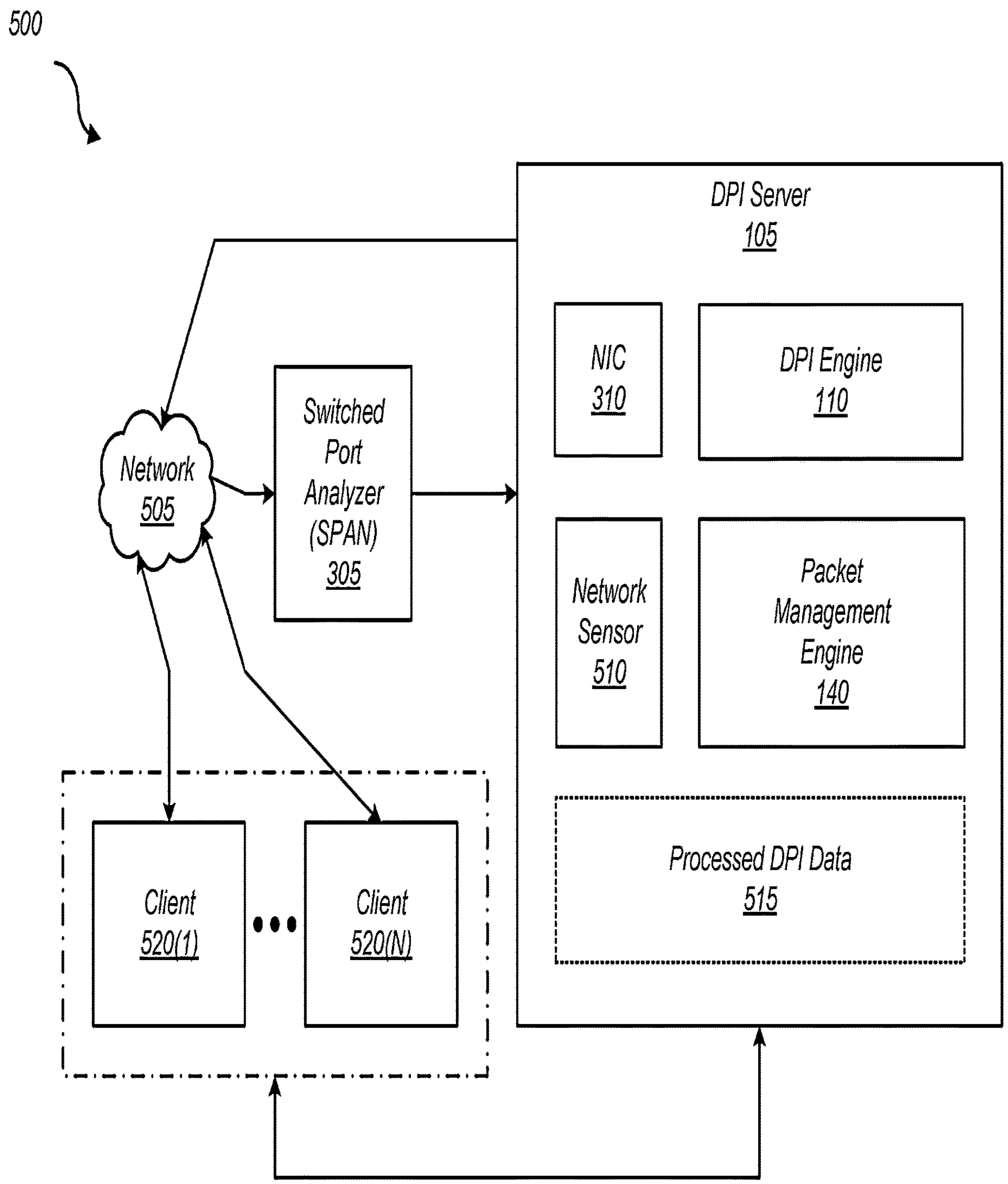
FIG. 5 is a block diagram 500 of a networked system that includes a DPI server, according to one embodiment of the present disclosure.

FIG. 5 is a block diagram of a networked system, illustrating how various computing devices can communicate via a network, according to one embodiment. Network 505 generally represents any type or form of computer network or architecture capable of facilitating communication between DPI server 105 and clients 520(1)-(N). For example, network 505 can be a Wide Area Network (WAN) (e.g., the Internet), a Storage Area Network (SAN), or a Local Area Network (LAN). As shown in FIG. 5, DPI server 105 also implements SPAN 305 (also called port mirroring or port monitoring) that selects network traffic (e.g., network packets and/or batches of network packets) for analysis by a network analyzer (e.g., by a network analyzer like DPI engine 110 that is part of DPI server 105).

DPI engine 110 may be part of DPI server 105, or may be separate. The networked system of FIG. 5 can include one or more Switched Port Analyzers (SPANs) for port mirroring, one or more Network Interface Controllers/Cards (NICs), one or more isolated CPU cores, and shared memory ring buffers (e.g., as shown in FIG. 3). In some examples, all or a portion of DPI server 105 may represent portions of a cloud-computing or network-based environment. These cloud-based services (e.g., software as a service, platform as a service, infrastructure as a service, etc.) may be accessible through a web browser or other remote interface. The embodiments described and/or illustrated herein are not limited to the Internet or any particular network-based environment. Various functions described herein may be provided through a remote desktop environment or any other cloud-based computing environment. In addition, one or more of the components described herein may transform data, physical devices, and/or representations of physical devices from one form to another. For example, DPI engine 110 may transform the behavior of DPI server 110 to perform enhanced high-speed DPI of batched network packets by avoiding (or ameliorating) dependency hazards and permitting a compiler to utilize loop unrolling as a viable optimization methodology.

Additional Embodiments

Figure 6:
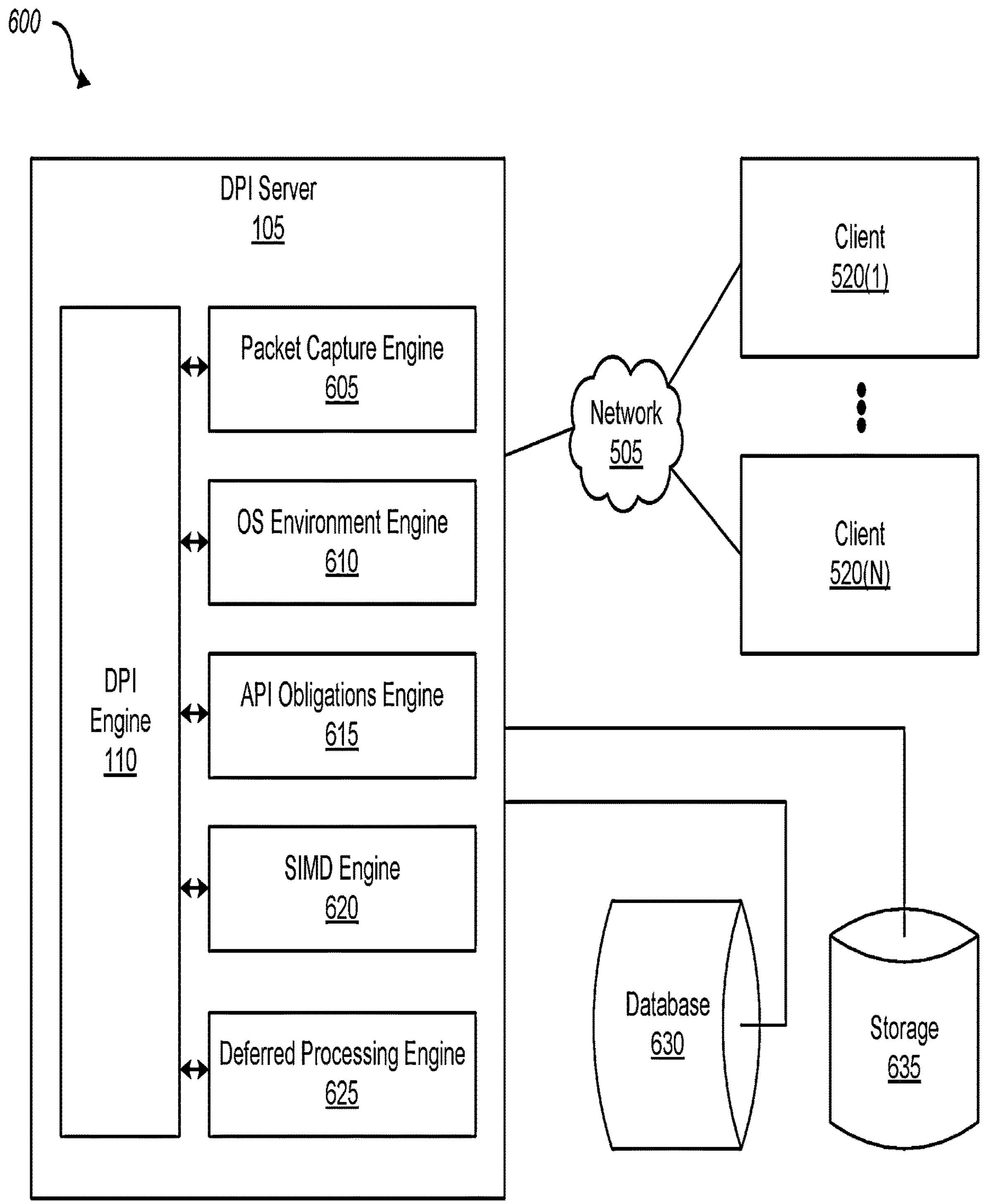
FIG. 6 is a block diagram 600 of a high speed DPI computing system that performs optimized batched packet processing in addition to other operations, according to one embodiment of the present disclosure.

FIG. 6 is a block diagram 600 of a high speed DPI computing system that performs optimized batched packet processing in addition to other operations, according to one embodiment. It will be appreciated that in addition to the foregoing embodiments, also disclosed herein are methods, systems, and processes for processing network packet data at enhanced speeds. For example, one or more embodiments disclosed herein, either alone or in combination, provide methods, systems, and processes to determine how DPI engine 110 (e.g., 10 GBPS and faster) can be configured to perform (and/or facilitate the performance of) DPI using: (1) Packet Capture, (2) Operating System (OS) Environment, (3) Application Programming Interface (API) Obligations, (4) Single Instruction, Multiple Data (SIMD), and (5) Deferred Processing.

In one embodiment, network packet sockets are replaced with DPDK poll-mode drivers and hardware multi-queue receive/receive-side scaling (RSS) is used to distribute traffic (e.g., network traffic among threads 335(1)-(N)) among multiple CPU cores (e.g., isolated CPU cores 330(1)-(N) as shown in FIG. 3) using packet capture engine 605.

In another embodiment, OS environment engine 610 permits the use of real-time scheduling and isolcpus (e.g., a kernel boot parameter that isolates certain CPUs from kernel scheduling, thus permitting the dedication of CPUs for special tasks with unwanted interruption in a multi-core system) to perform packet-capture and analysis to avoid cache pollution and task-switching caused by time-sharing with other tasks. In this example, Hugepages (e.g., a mechanism that permits a kernel (e.g., a Linux kernel) to utilize the multiple page size capability of modern hardware architectures) are leveraged to make better (or optimized) use of a translation lookaside buffer (TLB) (which is a scarce resource) and balance memory objects among multiple dynamic random-access memory (DRAM) channels offered by server hardware.

In some embodiments, Application Programming Interface (API) obligations engine 615 provides for text-based to efficient, binary, data transfer mechanisms as a way to interface with other components of the system disclosed herein (e.g., text processing a key bottleneck in DPI). Related to this issue is the periodic scan-and-dump hash tables using fork( ) and copy-on-write (COW), which is also very computationally costly and computing resource intensive. In other embodiments, Single Instruction, Multiple Data (SIMD) engine 620 takes advantage of wide vector units, SIMD, and hardware text-processing capabilities to increase the performance of network protocol parsers.

In certain embodiments, deferred processing engine 625 simplifies and reduces the amount of state-tracking performed in a DPI core and utilizes post-processing 355 (e.g., which is deferred to later stages in a packet-processing pipeline). In one embodiment, the techniques discussed above are backported to a system where they are self-contained changes (e.g., fast decoders). Because a bulk of the complexity in implementing the above techniques lies in a few large decoders (which are difficult to test), decoders are ported one-by-one wholesale to a new core system (than in a piecemeal manner).

Example Structure

In one embodiment, the methods, systems, and processes disclosed herein create, generate, provide, implement, or execute a self-contained executable ("the executable") that runs as a single Linux process. For example, the self-contained executable includes a single master configuration file that refers to several other input files that contain read-only data that the system disclosed herein maps and uses during its operation (e.g., a cluster-based association rule (CBAR) rules database, and the like). In other embodiments, the executable is statically linked against a Data Plane Development Kit (DPDK)—which is a set of data plane libraries and network interface controller drivers for fast packet processing. DPDK uses libpthread to spawn several threads (depending on configuration). This process responds to SIGINT (a program interrupt signal) and shuts down. In some embodiments, the methods, systems, and processes disclosed herein are configured to execute: (1) with memory allocations serviced from hugepages (e.g., 1 GB hugepages), (2) on an isolated CPU (isolcpus), and (3) with direct access to Peripheral Component Interconnect (PCI) hardware. In some examples, the methods, systems, and processes disclosed herein can be configured to execute as a process with any or all of the above (1)-(3) disabled.

Example Build

In certain embodiments, the software or program code to execute or facilitate execution of the various embodiments disclosed herein is split over multiple directories and uses an iterative makefile to build the code. Rote and tedious parts of code are auto-generated by Python programs that use jinja2 templating language to generate C files. This technique is used for binary message format marshalling/unmarshalling and config file (configuration file) parsing. In this example, the default CBAR rule-set is also compiled during build into a binary rule-file (but the rule-file is configurable and not built into the binary). The methods, systems, and processes disclosed herein (e.g., DPI engine 110) have minimal runtime dependencies (e.g., DPDK, hyperscan, libpcap (optional)) and a minimum CPU requirement of SSE 4.2. In one embodiment, multiple binaries—each for a different CPU level are contemplated. Build-time dependencies are also minimal.

Example of Packet RX Hot-Path

Example of Multi-Queue, Multi-Core RX and Kernel Bypass Architectures

In certain embodiments, packet reception is a performance critical hot-path in DPI engine 110. Actions which are performed for each packet execute with the highest frequency. For example, even other costly processing such as a string parsing or regex (regular expression) matching tends to pale in comparison since they are executed much less frequently. For this reason, packet RX (receive queue) is a part of the disclosed and example code-base.

In one embodiment, multiple cores are scaled by DPI engine 110. However, without leveraging hardware RSS (receive-side scaling), the foregoing cannot be performed efficiently. Therefore, in this example, with RSS, packets are hashed and steered to a specific CPU for reception such that packets from a given flow are handled by one CPU in the computing system. It will be appreciated that the foregoing process avoids the need for synchronization between CPUs during packet reception.

In certain embodiments, DPI engine 110 supports at least two different packet reception mechanisms: (1) Linux kernel RX_RING with FANOUT_CPU and RSS configured via ethtool (e.g., a stopgap before DPDK is deployed or as a fallback for driver issues) and (2) DPDK kernel-bypass poll-mode drivers with direct RSS setup. Because the default Toeplitz hash key on many network interface cards (NICs) is not symmetric, in some embodiments, DPI engine 110 uses the "65da" hash key per scalable TCP session monitoring with RSS with internet protocol (IP) src/dst as input tuple to ensure: (1) even (as possible) distribution of flows to CPUs, (2) symmetric flow distribution: both sides of flows are handled (or processed) on the same CPU, and (3) fragments of the same IP packet are handled (or processed) on the same CPU (e.g., by avoiding using the User Datagram Protocol (UDP)/Transmission Control Protocol (TCP) port in the hash tuple).

Example of a Shared-Nothing and Avoiding False-Sharing Architectures

In some embodiments, data structures disclosed herein (e.g., struct in the C programming language, and the like) used during the hot-path of packet reception are designed (and configured) with cache efficiency and elimination of false-sharing between threads.

Threads share (approximately) nothing and have (practically) no locking or synchronization between them. This model is called "shared-nothing multi-threading." In the rare (e.g., low frequency) case that information needs to move between threads, lock-free ring-buffers are used that can process data at a 10 GB line rate. Most structures fit in a single cacheline and are so aligned (e.g., packet structure, flow state, and the like). Structures that overflow a cacheline are aligned up to be two cachelines and judicious use of a prefetch is applied so that a parallel request can be used to memory hardware when the structure is loaded. DPDK allocators can also be used to stripe memory objects among several (e.g., four) Dynamic Random Access Memory (DRAM) channels on the contemplated computing system for further memory bandwidth efficiency.

Example of Performing NIC Acceleration

In some embodiments, alternate forms of NIC acceleration such as large receive offload (LRO) and virtual local area network (VLAN) tag stripping, and the like, are contemplated.

Example of Using Burst-Mode Reception

In one embodiment, DPI engine 110 utilizes DPDK's burst-oriented interface to the Programming Mistake Detector's (PMD's) to process packets in a cache-efficient manner. Rather than applying different processing in turn to each packet, DPI engine 110 applies each step to a burst of up to sixty-four (64) packets, then the next step to all the packets, and so on. The foregoing process improves efficiency by optimizing the use of CPU caches.

In some embodiments, DPI engine 110 performs the following burst-mode reception procedure that includes at least the following steps: (1) receives a burst of packets from an ethernet driver, (2) decodes the burst of packets (ethernet/TCP/IP), (3) looks up/inserts hash table entries for a burst, (4) updates the statistics for a burst (all at once), and (5) calls in to inspect functions for different packets. In other embodiments, the DPI engine implements and utilizes a Streaming SIMD Extensions (SSE) accelerated TCP/IP decoding fast path where SSE is used to mask out IP addresses, IP protocol, and TCP/UDP ports from a flow with mask instructions on wide SSE registers. The foregoing process changes the layout of hash table items, as discussed below.

Example of a Flow-Hash in a DPI Engine

After receiving a packet, DPI engine 110 matches the packet to a flow. Flows are stored in a hash table (e.g., hash table 150) for rapid retrieval. The flow structure includes statistics (e.g., flow statistics 155(1)-(N)) as well as information about which protocol decoder (e.g., one of decoders 165(1)-(N)) should be used to process the packet data as well as the protocol-specific state required for that (particular) decoder. Because hash table 150 can be large in size, and a lookup has to be performed for nearly every packet received, performance is critical. Further, and in certain embodiments, because typical computing systems do not possess infinite memory, and processing cannot be aborted in a memory allocation failure, an upper bound on the hash table size is set and the table is allocated in advance. However, because the table size is fixed, the table can fill, and because the table can fill, a strategy for eviction is required.

In one embodiment, an optimized Robinhood hash implementation is used. In another embodiment, DPDK's cuckoo-based hashing is used (e.g., with DPDK's support for multi-threaded operations).

It will be appreciated that in some implementations and systems, eviction strategy can be very expensive and costly (from a computational standpoint). For example, some implementations scan entire tables for expired flows that are then deleted. However, during a DoS (Denial of Service), the foregoing process can fail to free up flows. Therefore, in some embodiments, unidirectional flows are identified for eviction (e.g., by hedging on these unidirectional flows being malicious).

In addition, because there may not exist a method to perform a partial scan of the table and quit early, hundreds of thousands or even millions of items may need to be scanned once eviction kicks in. However, by evicting items in bulk, a high/low watermark system can be obtained that amortizes the cost over subsequent operations (e.g., provided a significant number of victim entries are located).

In another embodiment, example hash tables export information in a timely or optimized manner. Therefore, if timer maintenance is performed during hash lookup, precise upper bounds on the staleness of data can be setup.

In one embodiment, a hash table algorithm called xhash is implemented.

In some embodiments, DPI engine 110 implements one or more of: (1) bucketized cuckoo hashing, (2) coarse-grained monotonic clocks for expiry, (3) lazy hash table expiration, and (4) checking multiple expiries at a time with SIMD.

In certain embodiments, results achieved by prior systems and implementations are improved upon by at least: (1) outputting statistics with timeline guarantees (e.g., unwritten data cannot be more than n seconds old), (2) providing a facility for notification of expired timers, also with a timeliness guarantee (e.g., timer expiration events can be late, but not more than n seconds late), and (3) utilizing a biased randomized eviction policy when inserting into a full hash—a process that guarantees that inserts will succeed and that items that are evicted to make this the case are more likely to be old flows than recent flows).

In other embodiments, a fast universal hash is utilized that permits DPI engine 110 to be resistant to hash-based DoS attacks if a random seed per thread is selected (or picked). In one embodiment, SSE acceleration and parallel hash table lookups can be performed with cuckoo hashes in hash table design. The foregoing can be combined with an SSE decode stage to exploit initial program load (IPL) in the RX hot-path. The foregoing methods, systems, and processes at least meet the goals of: (1) high performance flow-tracking, (2) reliable production of high-fidelity, up-to-date, flow statistics, and (3) resistance to DoS attacks.

Example of Performing TCP Reassembly and a Decoder API

TCP reassembly is often required to produce meaningful results. For example, it is not uncommon for a single logical message in an application layer protocol to be split among multiple TCP segments. It is also not uncommon for multiple small messages to be packed into a single TCP segment as protocol implements strive for efficiency. When this happens, a single message can become split between two segments. Finally, transient gaps in TCP streams are not uncommon as packets can be re-ordered in flight. Also, when a sensor experiences packet loss (e.g., because a sensor is a passive device), there is no practical mechanism to request a retransmit. Therefore, it can be necessary to perform TCP reassembly, where the TCP reassembly accounts for minimal packet reordering and provides self-contained functionality that is transparent to decoders.

In certain embodiments, DPI engine 110 uses an optimized version of a reassembly algorithm. A flow undergoing reassembly contains a pointer to a ‘head’ structure that contains metadata such as a start sequence, end sequence, and information about any sequence gap (if present). If such a gap is present (e.g., due to receiving reordered packets or packet loss), future segments can shrink the hole or leave it as-is. In this instance, the hole cannot be split and a new sequence gap cannot be created. In some embodiments, multiple concurrent sequence gaps can be permitted by generalizing DPI engine 110. However, it should be noted that the number of sequence gaps follows a power-law distribution. The ‘head’ structure noted above also points to buffers that hold the data that is being reassembled. In one embodiment, the buffers are sized to be larger than the largest possible TCP segment assuming ethernet maximum transmission unit (MTU) (e.g., greater than 1460 bytes). The foregoing optimizes for the common case where a message has been split into segments naturally due to being larger than the MTU.

In certain implementations, eviction policies for the foregoing (flow) structures are local. For example, there are a number of fixed buffers that can be associated with a given flow at any one (or given) time. Once this figure is exceeded, reassembly is aborted. Therefore, in some embodiments, a more robust policy is implemented (e.g., using Robust TCP Stream Reassembly in the Presence of Adversaries (REASM), and the like).

One major element of the reassembly module (that can be part of DPI engine 110 or implemented with DPI engine 110) is the close coupling with application layer decoders. In some embodiments, the decoder API is designed to provide feedback about where application-layer message boundaries exist and where reassembly is or is not required. This permits the reassembly module discard data that can be processed without reassembly as soon as it arrives and is intended to reduce the demand for reassembly only to those places where it is needed. For example, the Hypertext Transfer Protocol (HTTP) decoder often has information regarding how much content is in an HTTP response ahead of time due to the “Content-Length” header. If a segment is missing during the response, the HTTP decoder gets a chance to veto the initiation of reassembly that would normally occur. This can prevent wasteful allocation of reassembly resources.

Example of Performing Content-Based Application Recognition (CBAR)

In an initial implementation of the methods, systems, and processes described herein, CBAR is implemented as a “traffic fingerprinting” module. In one embodiment however, CBAR is enhanced and rebranded into CBAR building on the original code and rule-set. In certain cases, computing systems implementing a DPI engine can be based on a signature(s) file that contains a list of rules, each of which contains one or more criteria. The criteria can include string searches or regex matches, both optionally bounded by start/end offsets, or simpler criteria such as port or packet size comparisons. In some embodiments, the suite of enhancements in CBAR adds the ability to use a C function as a match criteria that can then be used to provide more detailed validations (e.g., for binary protocols (e.g., TLS) or where large lookup tables are required (e.g., to match Remote Procedure Call (RPC) protocol identifiers (IDs)). In other embodiments, CBAR enhancements also provide for more protocol-specific matching, adding a new rules-file that looks inside HTTP, and HTTP-formatted protocols such as Session Initiation Protocol (SIP), Simple Service Directory Protocol (SSDP), or Real Time Streaming Protocol (RTSP)).

In certain embodiments, both the original and CBAR enhanced DPI systems are implemented in terms of linked lists of rules, each of which contain a linked list of criteria. This is a pessimal rule-matching algorithm, so a set of mitigations can be implemented. In one embodiment, a service-cache keyed on server-port and server-IP can be used to reduce the frequency of full matches. In another embodiment, a move-to-front heuristic can be used on matching rules that serve to adaptively rule the DPI system (e.g., DPI server 105) to current network conditions (e.g., often-used protocols are matched earlier).

In some embodiments, at least three changes are made to DPI systems, DPI engines (e.g., DPI engine 110), and DPI implementations to improve performance: (1) the use of hyperscan to efficiently perform set-wise regex matches on entire rule-sets at once and take advantage of SIMD capabilities in a CPU, (2) pre-compilation of rules into arrays to provide CPU cache-locality during rule-set traversal, and (3) simplification of HTTP-rules and the utilization of a SSE optimized HTTP parser to implement said (the above-discussed) rules (e.g., by only permitting or allowing HTTP method or protocol matching).

In one embodiment, pre-compilation is performed by the ‘cbar’ tool in the Python support code. In some embodiments, both regex and CBAR results are cached for each packet in a bitmap. This means that regex matches only run at most once per packet, and a given cfunc can only run once per packet. In other embodiments, an implemented service cache is implemented per-CPU. The move-to-front heuristic can also be implemented. It will be appreciated that the optimized rule matching disclosed herein can significantly improve performance of a DPI engine or DPI computing system (e.g., based on performance benchmarks).

Example of Performing Port Scan Detection

In certain embodiments, a first response packet in a TCP flow is evaluated and fed into a port scan detection engine (e.g., to determine which ports on a network are open by sending packets to a given port and analyzing the response). In this example, the input parameters are the TCP 4-tuple and a Boolean flag for accept/reject, which is set to ‘reject’ in case the TCP RST (reset) flag is set to ‘accept’ in all other cases. If a connection times-out in SYN_SENT state, then DPI engine feeds the 4-tuple with the corresponding ‘reject’ flag.

In some embodiments, a sequential hypothesis testing in the form of a threshold random walk algorithm (TRW) is used to score each IP client in the high speed DPI system (e.g., DPI server 105). In this example, a hash table (e.g., hash table 150) and a linked list is used to keep track of hosts/ports connected to by a given potential-scanner IP address. A second hash table can be used to optimize away any potential duplicate entries in the (original) list. Once the TRW algorithm detects a scanner, the list is analyzed (e.g., walked) and an attempt is made to summarize the information and classify the event into either a portscan or a netscan, and report ranges of ports and most prominent IP, or range of IPs and most prominent port, respectively. In some examples, the use of a connectionless port scan detection on the backbone (TAPS) is also contemplated.

Example of Configuring Alerting

In one embodiment, alerts are binary formatted. Serialization and de-serialization code for the format is automatically generated from schema files at build time. The compiler for the serialization schema also produces Python reader/writer classes for use in the test suite. In this example, an alertd-like alert-handling process also has other benefits. For example, this process can be relied upon to carry out much of the stateful processing (e.g., stateful processing performed by primary (stateful) packet manager 115 as shown in FIG. 1).

The foregoing stateful processing can be performed with flexible performance requirements because it will not hold up packet processing and can be batch-oriented (e.g., as opposed to a real-time model). In some embodiments, a save/restore process is implemented in the stateful processing process using an exist database (e.g., SDB) rather than an opaque binary format (as implemented by some solutions and systems). Therefore, spooling incoming events on disk and then processing the events provides computational and technical flexibility in terms of the analysis that can be implemented, robustness/simplicity of the disclosed DPI system, and distribution of processing (e.g., in cm/probe type scenarios).

Example of Performing High-Resolution Bandwidth Tracking

The dump interval is a trade-off between database size and resolution of data in the time domain. However, regardless of how small the dump interval is, queries for time resolutions smaller than the interval cannot be answered. Therefore, certain DPI computing systems and solutions suffer from the foregoing problem. For example, given 1 minute intervals, the overall bandwidth of a transmission at 100 mbps for 30 secs in a given minute shows up as 50 mbps. Therefore, a query like “find all hosts which sent traffic at >=100 mbps” cannot be performed. In addition, there is another theorical concern and technical problem—network traffic is highly bursty with many congestion events caused by so called ‘microbursts’ or bursts of traffic at the 100’s of microseconds timescale. Therefore, the timescale upon which bandwidth is recoded is also an important parameter for anomaly detection algorithms.

Therefore, in certain embodiments, a dynamic-bucket-merge algorithm (DBM) is used to replace the single packet/byte counter variables that are produced. For example, DBM works by placing events into a fixed number of buckets and merging buckets whose min/max bandwidth measurements are the lowest. For example, flat-rate traffic and N burst events requires 2N+1 buckets for accurate representation (e.g., using a greedy algorithm that builds a solution piece by piece by making an optimal choice at each step to accurately produce these foregoing results). Therefore, the representation of flat traffic rates and 3 bursts within a 1 minute interval requires 7 buckets (e.g., flat, burst, flat, burst, flat, burst, flat) and the start and end times of each bucket can be adjusted to match where the bursts were. The foregoing representation also permits DPI engine 110 to answer other queries for performing operations (e.g., security operations).

For example, in certain embodiments, DPI engine 110 can be configured with the above-discussed representation to perform security-related computing operations and/or anomaly detection by determining answers to at least the following (type of) queries: (1) what is the maximum bandwidth used at time scale t? (e.g., determining who the heavy hitters are), (2) what is the standard deviation and 95$^{th}$ percentile of the bandwidth at time scale t? (e.g., determining whether the heavy hitters are outliers and/or anomalies), and (3) what is the coarsest time scale at which bandwidth exceeds some limit L? (e.g., determining who is exceeding the bandwidth limit expectations, and whether it a sustained usage or just a momentary congestion event).

In some embodiments, DBM includes a parameter. In addition to determining the dump interval, DPI engine also determines the number of buckets in the dump interval (e.g., and therefore how many bursts that are accurately represented). Therefore, DPI engine 110 also dynamically sizes the number of buckets depending on how “bursty” the network traffic actually is.

Example Testing and Testing Data

In one embodiment, a makefile target (e.g., ‘test’) exists to execute automated tests executed by DPI engine 110. There are several types of tests that have differing aims and targets and include, but are not limited to: Unit tests for Python support code, Esynth tests for DPI engine, Pcap (an API for capturing network traffic) tests for DPI engine, C unit tests (with test data): HTTP decoder, C unit tests (self-contained): TCP reassembly and Hash table, and other testing scenarios including: scangen that generates randomized portscan pcaps from 3 parameters and a random seed, and SMB2 (Server Message Block, version2) decoder stress test that produces large randomized pcaps of SMB2 traffic.

Example Coverage Measurement

In one embodiment, a gcov (a source code coverage analysis and statement-by-statement profiling tool) build is added to the regular build to ensure that coverage is received in critical parts of the code: decoders (e.g., decoders 165 (1)-(N)) and essential core code.

Example of Esynth-Based Testing

Esynth is a flow-synth based language for generating pcaps.

The primary purpose of Esynth is for testing. It is a standalone, from scratch, re-implementation (e.g., in Python) of the flowsynth language. Esynth can be extended to permit support for complex protocols such as Sever Message Block (SMB) 2 (e.g., by using a modified pysmb, among other methods) and can be implemented using an optimized TCP/IP implementation.

In some embodiments, DPI engine 110 implements a python-asyncio based (or similar) API that uses co-routine-based concurrency to permit development of agent-based whole-network simulations that can be used for an SMB-2 stress test tool. This tests the SMB2 decoder’s ability to handle a large number of in-flight SM2 transactions across multiple flows and multiple sessions on a simulated network. In addition, DPI engine 110 also implements a portscan generation tool that creates scans over multiple IPs and ports with a given hit-rate. This tool is used to test the portscan detection module that is part of or implemented by DPI engine 110.

Example Decoders

Example of Designing an Optimized HTTP Decoder

In certain embodiments, a HTTP decoder supports the new reassembly API (discussed above) and permits continuous decodes in the face of missing packets by parsing responses and contents (e.g., even chunked-encoding contents). The foregoing optimization is important not to desynchronize the decoder with respect to POST requests and also permits production of new and useful metadata and analysis.

Example of Existing Decoders

FIG. 7 is a table 700 and illustrates a profile of an (existing) HTTP decoder, according to one embodiment. Existing decoders for DPI were created when state machines were fast and before ASLR (Address Space Layout Randomization) or sttni (String and Text New Instructions) existed. Therefore, existing decoders face performance-related technical issues (subpar performance). In certain cases, at least 20% of system performance can be wasted just finding the location of ctype because of the extensive use of isprint and other ctype functions. Because of ASLR and dynamic linking of glibc (e.g., the GNU C Library), a compiler cannot generate relative jumps/references to code/data. Therefore, the existing systems that perform decoding have to go through a PLT (Procedure Linkage Table) multiple times per byte of HTTP that is being decoded.

Another shortcoming is the fact that existing methods and systems do not make use of SSE4.2's STTNI instructions that can help speed up string processing by handing up to 16 bytes at a time with a single instruction. For example, profiles contain multiple testing characters and loop overhead/state maintenance (e.g., when drilling down into parse request). Automata-based approaches were considered state of the art for this technical problem relatively recently.

Example of Going Another Way by Using SSE-4.2

SSE-4.2 introduces the STTNI instructions. In one embodiment, a vpcmpe instruction covered by the _mm_cmpestri intrinsic is implemented. The foregoing instruction can search up to 16 bytes at a time for up to 16 individual characters or 8 character ranges. The foregoing can be applied to parsing HTTP efficiently.

FIG. 8 is a code snippet 800 that illustrates a basic loop for a SSE instruction mm_cmpestri scan function, according to one embodiment. In some embodiments, the core of the disclosed HTTP parser (e.g., employed in DPI server 105, or in certain cases, in a browser, to extract metadata such as headers, content-length, request method, response status code, transfer-encoding, HTTP version, request URL, message body, and the like, from HTTP messages) is scanning left-to-right until a delimiter character is reached/hit (e.g., the colon (':') character when parsing HTTP headers, or encountering an invalid character such as an LF (which would break the parse and hence must be identified).

Example of Avoiding Dependency Hazards

FIG. 9 is a code snippet 900 that illustrates an implementation of a check to avoid dependency hazards, according to one embodiment. In one embodiment, the HTTP decoder is configured to avoid data dependency hazards. A dependency can be introduced between the vpcmpe instruction and the loop management code. The loop management cannot be speculatively executed in parallel any longer because the CPU cannot predict the result of _mm_cmpestri before it happens. In this example, a check with perf stat-d provides the data required to spot the foregoing (e.g., identical number of instructions executed, but less instructions-per-clock).

Example of Optimizing for the Common Case

In some embodiments, the vpcmpe instruction (discussed above) works best (or better) on longer (>=16 byte) tokens. However, some tokens in HTTP are expected to be (quite) small and often times the same (e.g., the HTTP method and the protocol on the request line). Therefore, in other embodiments, a fast-path is added using word comparisons and conventional casing to match these in one or two sets.

In one embodiment, for the method, a check is performed to determine if there are 4 bytes equal to "GET." If so, then a determination is made that a 3 byte method exists and the SSE code is skipped and the process goes straight to parsing the URI (Uniform Resource Identifier). For the protocol, "HTTP/1.1" is expected, which the process performs as a single 64 bit integer comparison (and again skipping the parsing—provided CRLF (Carriage Return) or LF (Line Feed) comes next).

Example of Fast Case-Insensitive String Comparison

FIG. 10 is a code snippet 1000 for performing fast case-insensitive string comparison, according to one embodiment. It should be noted that using strncasecmp( ) or ncasesmp( ) is sub-optimal to check, for example, that a header name is equal to "Proxy Authorization." These foregoing functions case convert both parameters, but a DPI system typically only needs one of them case converted (e.g., the one off the wire). In addition, a case table is pre-calculated based on ctypes with a constructor function to avoid the PLT lookup cost.

The byte-by-byte approach of ncasecmp-like functions cannot easily be avoided since AVX (Advanced Vector Extensions) does not permit parallel LUT (Lookup Table) lookups or conditionals (e.g., although a SPMD-like approach is contemplated). Therefore, for fast path, DPI engine 110 performs word-sized comparisons based on the conventional casing scheme used by a significant number of clients. If the fast path tests fail, byte-by-byte processing is a fall back.

Examples of Measurement and Evaluation Techniques

The measurement and evaluation numbers provided herein are exemplary in nature and were taken when the parsers are at bug/feature parity. In some embodiments, each HTTP parser is run against the content of a file in a tight loop (e.g., 10 million times). The large number of iterations is to smooth out any variance in the measurements. The file includes a HTTP request. A couple of precautions are taken to ensure valid/accurate measurements.

In one embodiment, a result from the parse is stored into a volatile variable. This operation can prevent a compiler from dead-code-eliminating the parser. The parser is also run/executed at least once outside of the measurement loop and the results are printf'd to check that the parser is working for the particular/given data file and to also provide another incentive for the compiler not to dead-code-eliminate the code. In another embodiment, before performing rdtsc (Read Time-Stamp Counter), a cpuid (instruction) is issued (e.g., per a developer guide). This process acts as a complete barrier and speculative execution is completed before the timestamp counter is received. If not for the this process, the rdtsc instruction can be executed out of order before the work is completed, adding variance to the measurement. This is performed with an inline assembly block that acts as a compiler barrier to prevent the compiler from reordering code.

Examples of Performance Results

FIG. 11 is an illustration 1100 of a code snippet for evaluation and tables of performance results, according to one embodiment. In certain embodiments, evaluation is performed on a standalone test tool using CPU timestamp counters (as described above) over a large number of iterations to determine the performance of the decoder parsing a given HTTP request. In some examples, a 13× speed up is noticed. In other examples performed with a big (e.g., roughly 3 KiB) cookie in the request (e.g., from a browser session with a real site), the decoder is able to skip over the bigger fields 16 bytes at a time, resulting in a 23× speed up.

Examples of TLS and QUIC/HTTP3 Decoders

In one embodiment, unencrypted SSL (Secure Sockets Layer) and TLS (Transport Layer Security) handshakes are decoded. The data/information extracted, includes: selected cipher suites and TLS protocol version, NPN (Next Protocol Negotiation) and ALPN (Application-Layer Protocol Negotiation) headers, SNI (server name), and the server certificate. In another embodiment, the QUIC (Quick UDP Internet Connections) decoder also examines unencrypted client hello messages and extracts the following information: clients preferred cipher suite, server name, and user agent.

Example of Implementing a SMB2 Decoder

In some embodiments, the disclosed SMB2 decoder produces low-level protocol events and maintains state for multiple inflight requests. In this example, the decoder does not store session IDs, shares, or file descriptors. The decoder tracks strings across open-request/open-response or tree-connect/tree-disconnect responses. It is contemplated that the alert-thread or an external alertd-like process can use a database to track mappings between session-IDs, file-IDs, and human readable strings, and the like, obviating the need for shared state between CPU cores and for complex save-restore logic within the disclosed methods, systems, and processes.

Examples of Other Decoders

In other embodiments, various other or alternate types of decoders (e.g., decoders 165(1)-(N)) and decoding methodologies are contemplated.

Example Performance Results

It should be noted that the following performance results are exemplary and/or conservative estimates. In some embodiments, tests were performed on 2× Intel® Xeon® Silver 4110 CPU @ 2.10 GHz (8 cores each), 32 GB RAM (16 GB in each node), and 10G X550T NIC. The hardware computing device setup included: isolated CPU, hyper-threading disabled, turbo boost disabled, EPB MTR (energy performance balance) set to performance, CPU frequency scaling governor: performance, and 1 GB hugepages (reserved 8 GB per note). A single DPI core was used for tests.

Example of Pure Packet Processing (Plus UDP CBAR)

Figure 12:
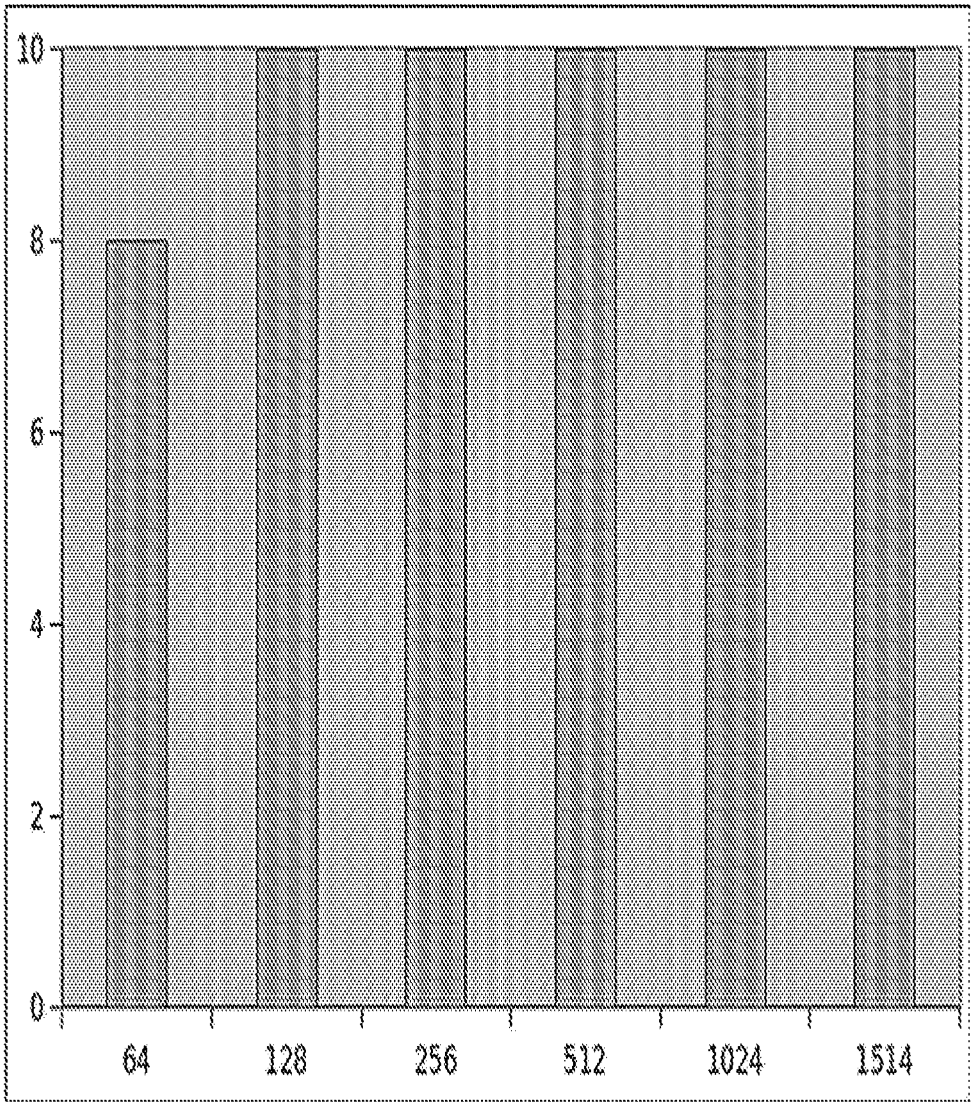
FIG. 12 is a graph 1200 that illustrates throughput for different UDP packet sizes, according to one embodiment of the present disclosure.

FIG. 12 is a graph 1200 that illustrates throughput for different UDP packet sizes, according to one embodiment. In some embodiments, pure packet processing is performed and throughput for various UDP packet sizes is determined.

Example of CBAR (TCP, Non-Matching Packets)

Figure 13:
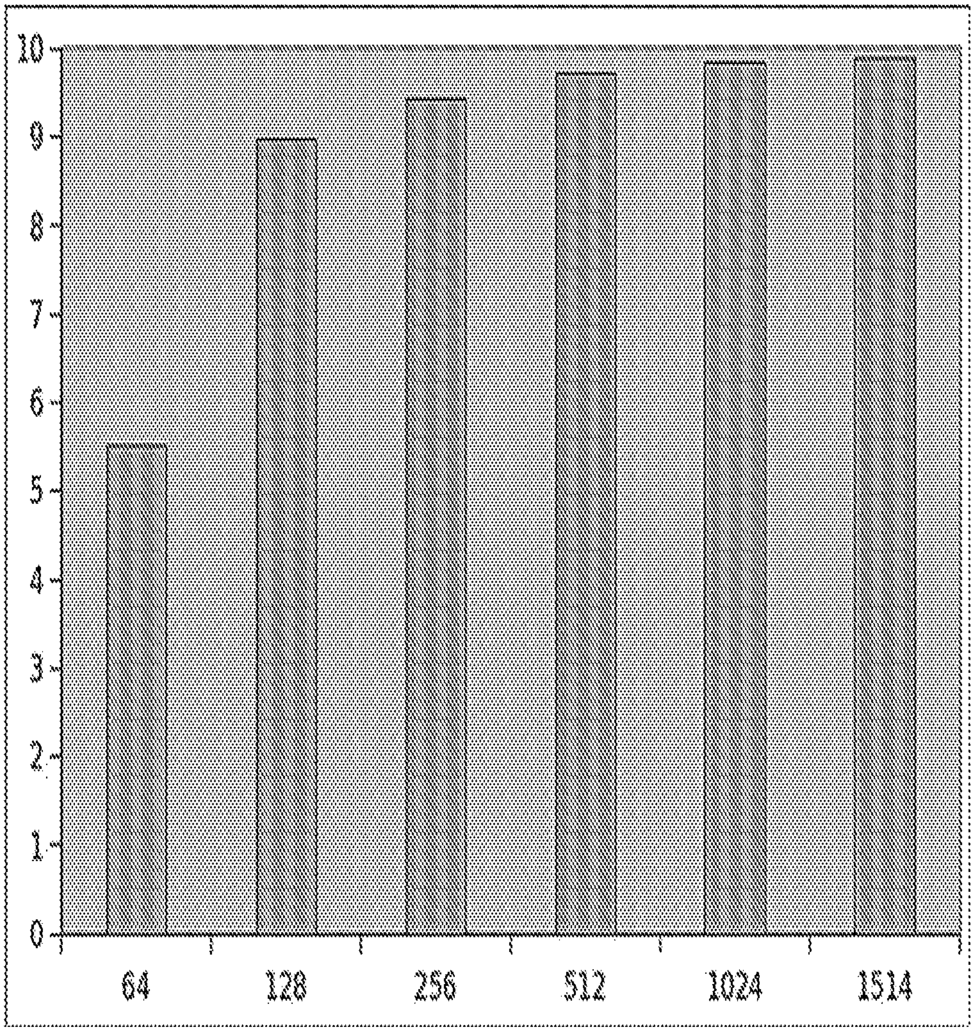
FIG. 13 is a graph 1300 that illustrates throughput for different TCP packet sizes, according to one embodiment of the present disclosure.

FIG. 13 is a graph 1300 that illustrates throughput for different TCP packet sizes, according to one embodiment. In other embodiments, throughput for various TCP packet sizes (e.g., for non-matching TCP packets) is determined.

Example Results from TLS Decoder, HTTP Decoder, and SMB2 Decoder

TLS Decoder—accessing Google® front page with Firefox: 10 gbps; HTTP Decoder—accessing Google® front page with Curl: 10 gbps; and SMB2 Decoder—Esynth example (discussed above): 10 gbps.

Example of an Empirical Investigation into Flow Table Sizing

It should be noted that the average lifetime of IP flows is under 10 seconds. In typical datacenters, approximately 50% of flows are under 100 milliseconds and upwards of 85% of flows appear to be under 10 seconds in length. In one example, the number of active flows in any given second was reported to be under 10,000 across multiple datacenters. For campus traffic, the average flow lifetime can be around 7.1 seconds.

These statistics are particular to the disclosed DPI engine and its configuration and operation because there is a direct relationship between flow lifetimes and the hash table sizes needed for the DPI engine called Little's law: $L=\lambda W$. An assumption is made that $\lambda$ (average flow lifetime) is relatively unvarying and that W (arrival rate of new flows) varies by network size (e.g., the bigger the network, the more flows). Therefore, in the methods, systems, and processes disclosed herein, if the dump interval is 5 minutes and the average flow lifetime is expected to be 7 seconds, then the hash tables are going to be approximately 43× too big. In other words, it can be expected that 97% of the flows in the hash tables will be finished by the time they are dumped.

Example of an Experimental Methodology

Expiration (EXP)—In one embodiment, of the flows recorded in a (data) dump, the percentage of flows that appear in the next dump (e.g., 5 minutes later) is determined. The foregoing determination results in an approximation of the number of flows that are already expired by the time they are dumped (although this method will not count flows that stayed inactive during the next dump interval but became active later). AGE—In another embodiment, the age of each flow at dump time is calculated or determined by subtracting birth from last_seen timestamps. In this example, these time stamps are 1 second in resolution (so are an approximate).

Example EXP Results

For example, in each dump interval, approximately 150,000-160,000 flows are observed. Of those, between 88%-89% of flows are already expired at dump time (e.g., no more packets are seen for those flows in the next dump interval).

Example AGE Results

FIG. 14 is an illustration 1400 of a table and graphs of AGE results, according to one embodiment. In some examples, the mean average age of a flow is around 880 seconds (or around 14 minutes). But in these examples, the median age of a flow is 0 seconds (e.g., because timestamps are 1 second resolution which means less than 500 milliseconds old). The mean can be skewed by various very long lived outliers. Nearly everything is clustered around short-lived flows, with around 3% of flows lasting an hour or more. Among flows shorter than 1 minute, many are under 10 seconds, and a significant number are at most a few seconds old.

Example of a Big Table, Slow Performance

Dump times can be infrequent. If the dump interval is reduced, the hash table sizes can also be reduced by the same factor (e.g., based on Little's law). Dumping and expiration require scanning the entire hash table. Therefore, if the hash table is 50× too big, then the hash table can be at least 50× too slow. Consequently (and unfortunately), processing of 2M (2 million) packets in 1M flows (e.g., HTTP request and acknowledgement per flow) by certain DPI engines and methodologies results in 11M LLC (last level cache) cache misses (e.g., an LLC cache miss event requires going to DRAM). In some embodiments and examples, the optimized high speed DPI engine 110 disclosed herein along with associated methods, systems, and processes reduces the above number to (approximately) 193,000. This means that 2 instructions per CPU cycle are possible instead of 1.3. In addition, because there is no stalling on DRAM accesses, there is more time left to perform decoding and analysis of the (network) traffic.

Example of Small Table, Lost Data

In one example, a pcap file includes 1,000,000 flows (1M flows) with a HTTP request and an ACK (acknowledgement) in each flow. In some examples, when a hash table size is set to 1,000,000, certain DPI systems run to completion in 3 seconds and record (all) flows (with a flow table size of 224 MB). Then, in one embodiment, the hash table size is set to 100,000 to simulate what happens if the hash table is under sized. With DoS protection enabled, certain DPI engines finish in 0.3 seconds—but only 148,910 flows are dumped. 85% of the flows are lost.

With DoS protection disabled, and in certain examples, some DPI engines can write 900,000 empty dump files to disk. Running this process to completion can result in the loss of nearly 90% of flows. In some examples, when executing a new hash table rig test, where flows are randomly evicted when the hash table fills, the entire task can run to completion in 0.4 seconds, while using 17 MB of memory. The flows can then be accurately recorded. The foregoing is true even when the hash table is reduced down to 2 MB. In summary, and in certain embodiments, it will be appreciated that approximately 99% of hash table memory usage can be saved to receive (or get) the same (or comparable) results, but also in a faster and more speedy manner, and without being vulnerable to a DoS attack.

Examples of Changes Made as a Result

In certain embodiments, DPI engine 110 is configured by the associated methods, systems, and processes disclosed herein to cause at least the following changes or modifications to existing or traditional DPI implementations: (1) reduction of dump-interval equivalent to, at most, 1 minute, (2) reduction of table sizes correspondingly (e.g., from 220 MB to 4 MB for the same sized or comparably sized network), (3) continuous streaming of flow update events, (4) when a table is full on insert, performing randomized or pseudo-LRU (least recently used) eviction (e.g., dumping a flow that is evicted so that no data is lost), and (5) contemplating the implementation of DBM algorithm.

Example Glossary of Terms

The following is a glossary of some of the terms used and referred to herein, according to or in one or more example embodiments:

| Term | Definition |
|---|---|
| CBAR | Content-Based Application Recognition. A heuristic technique for identifying application-layer protocols based solely on the contents of packets. |
| DSO | Dynamic Shared Object. Or DLL/Dynamically Linked Library. |
| DPDK | Data-Plane Development Kit. Intel libraries to accelerate packet processing applications. |
| ILP | Instruction-Level Parallelism. The capacity of modern super-scalar processors to execute multiple instructions in parallel. |
| Libpthread | POSIX threading library |
| LRU | Least-Recently Used. A replacement strategy for data structures that evicts the least-recently accessed item, usually in favour of adding some current item when the structure is full. |
| LTO | Link-Time Optimization. A technique which links together compilation units in a C program and performs inter-procedural optimisation on the whole program. |
| LUT | Look-Up Table. |
| MTU | Maximum Transmission Unit. Size of largest message supported by a networking medium. |
| NFS | Network File-System. File sharing protocol for UNIX. |
| PLT | Procedure Linkage Table. A lookup table used by dynamically linked code as an indirection to locate variables in a DSO |

-continued

| Term | Definition |
|---|---|
| RPC | Remote Procedure Call. A style of networking protocol in which messages are conceived of as function calls to be executed on remote network hosts. |
| RSS | Receive-Side Scaling, a/k/a Multi-Queue Receive. A technique implemented in NIC hardware which allows packet processing to be distributed to multiple CPUs in a system. |
| SIMD | Single-Instruction Multiple-Data. A CPU technology for executing multiple identical instructions in parallel on a single logical core/thread. |
| SMB, SMB2 | Server Message Block. Windows file/printer/etc-sharing protocol. |
| SSE | Streaming SIMD extensions. Intel SIMD extensions to the x86 instruction set. |
| STTNI | Sting Text New Instructions. Intel extensions to SSE for accelerated operations on strings. |
| SUNRPC | UNIX RPC mechanism. Underlying transport for NFS. |

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:

receiving a plurality of Internet Protocol (IP) packets including a set of packets associated with a flow;

for each packet in the set of packets:

generating a flow-hash lookup key for a packet based on a Transmission Control Protocol/Internet Protocol (TCP/IP) header of the packet; and accessing a flow state of the flow using the flow-hash lookup key, wherein the flow state is stored in a hash table and includes flow statistics of the flow, including a packet count and a byte count;

grouping the set of packets associated with the flow into a batch;

performing a stateful processing of the batch, including:

updating the flow state based on the batch, including the packet count and the byte count of the flow;

determining an application layer protocol inspection to apply to the batch;

for each packet in the batch:

performing a deep packet inspection (DPI) processing operation on the packet to decode a payload of the packet according to the application layer protocol inspection.

2. The computer-implemented method of claim 1, wherein:

the packet count and the byte count of the flow are updated using a dynamic bucket merge (DBM) algorithm.

3. The computer-implemented method of claim 1, wherein the updating of the flow state includes performing transport layer state tracking for the individual groups.

4. The computer-implemented method of claim 1, wherein the application layer protocol inspection is performed by a DPI server that executes a DPI engine.

5. The computer-implemented method of claim 4, wherein different batches of packets are stored in different receive queues stored at a network interface device of the DPI server.

6. The computer-implemented method of claim 5, wherein contents of different receive queues are processed by different threads associated with different Central Processing Unit (CPU) cores of the DPI server.

7. The computer-implemented method of claim 5, wherein the DPI server implements kernel bypass so that the DPI engine executes in user space to access the different batches directly from user space.

8. The computer-implemented method of claim 5, wherein the DPI engine accesses the different batches via a shared memory ring buffer.

9. The computer-implemented method of claim 5, wherein the DPI server is connected to a switch port analyzer to receive the IP packets from the switch port analyzer.

10. The computer-implemented method of claim 4, wherein the DPI engine includes one or more compiler optimization that increases an instruction throughput of the DPI engine when same-flow packets are batched.

11. The computer-implemented method of claim 10, wherein the DPI engine includes a loop unrolling optimization.

12. A system comprising:

a computer device that implements a deep packet inspection (DPI) server, configured to:

receive a plurality of Internet Protocol (IP) packets including a set of packets associated with a flow;

for each packet in the set of packets:

generate a flow-hash lookup key for a packet based on a Transmission Control Protocol/Internet Protocol (TCP/IP) header of the packet; and access a flow state of the flow using the flow-hash lookup key, wherein the flow state is stored in a hash table and includes flow statistics of the flow, including a packet count and a byte count;

group the set of packets associated with the flow into a batch;

performing a stateful processing of the batch, including to:

update the flow state based on the batch, including the packet count and the byte count of the flow;

determine an application layer protocol inspection to apply to the batch;

for each packet in the batch:

perform a DPI processing operation on the packet to decode a payload of the packet according to the application layer protocol inspection.

13. The system of claim 12, wherein:

the flow includes at least part of a Transport Layer Security (TLS) handshake; and the application layer protocol inspection extract from the flow one or more of a cipher suite, a TLS protocol version, and a server certificate.

14. The system of claim 12, wherein the DPI server is implemented as part of a port scanning system that scans for open ports on a network.

15. The system of claim 12, wherein the DPI server implements one or more anomaly detection algorithms based on analysis of packets.

16. The system of claim 12, wherein the DPI server is implemented in a cloud computing environment.

17. The system of claim 12, wherein the DPI server is configured to perform a stateless processing operation on the received IP packets, including a timer management bookkeeping operation to:

determine a current time of the batch; and expire flow data associated with the flow-hash lookup keys of the batch if the current time is after a bookkeeping time threshold.

18. The system claim 12, wherein the hash table is accessed in parallel using a multi-threaded lookup operation.

19. The system of claim 12, wherein:

the batch of packets is stored in a queue at a network interface device of the DPI server; and the stateful processing accesses the batch from user space using a kernel bypass mechanism.

* * * * *